United States Patent
Itakura et al.

(10) Patent No.: US 6,778,417 B2
(45) Date of Patent: Aug. 17, 2004

(54) ELECTRIC-POWER SUPPLYING DEVICES SWITCHING BETWEEN A SYNCHRONOUS RECTIFICATION AND A DIODE RECTIFICATION BY GRADUALLY ALTERING A SWITCHING PULSE

(75) Inventors: Kazuhiko Itakura, Kawasaki (JP);
Hiroshi Shimamori, Kawasaki (JP);
Kazutoshi Fuchigami, Kawasaki (JP);
Tsunehiro Ohno, Kawasaki (JP)

(73) Assignees: Fujitsu Limited, Kawasaki (JP);
Fujitsu Denso Ltd., Kawasaki (JP)

( * ) Notice: Subject to any disclaimer, the term of this patent is extended or adjusted under 35 U.S.C. 154(b) by 0 days.

(21) Appl. No.: 10/109,049

(22) Filed: Mar. 29, 2002

(65) Prior Publication Data

US 2003/0081433 A1 May 1, 2003

(30) Foreign Application Priority Data

Oct. 31, 2001 (JP) ........................................ 2001-335526

(51) Int. Cl.$^7$ ........................... H02M 7/44; H02M 3/335
(52) U.S. Cl. .......................................... 363/97; 363/16
(58) Field of Search ............................. 363/21.06, 45, 363/89, 20, 49, 39, 46, 125, 16, 97; 323/282, 283, 284, 285, 272, 275, 268, 266

(56) References Cited

U.S. PATENT DOCUMENTS

| | | | | |
|---|---|---|---|---|
| 3,733,540 A | * | 5/1973 | Hawkins | 363/89 |
| 5,036,452 A | * | 7/1991 | Loftus | 363/71 |
| 5,274,543 A | * | 12/1993 | Loftus, Jr. | 363/127 |
| 5,303,138 A | * | 4/1994 | Rozman | 363/21.06 |
| 5,414,341 A | * | 5/1995 | Brown | 323/268 |
| 5,920,475 A | * | 7/1999 | Boylan et al. | 363/127 |
| 6,246,592 B1 | * | 6/2001 | Balogh et al. | 363/16 |
| 6,307,356 B1 | * | 10/2001 | Dwelley | 323/282 |

FOREIGN PATENT DOCUMENTS

| | | |
|---|---|---|
| JP | 11-285258 | 10/1999 |
| JP | 2000-354370 | 12/2000 |

\* cited by examiner

*Primary Examiner*—Rajnikant B. Patel
(74) *Attorney, Agent, or Firm*—Arent Fox PLLC

(57) ABSTRACT

This electric-power supplying device comprises switching elements, rectifying elements, and a control circuit. The switching elements are switched according to a switching pulse so as to perform a rectification. The rectifying elements are connected in parallel with the switching elements so as to perform a rectification. The control circuit alters the switching pulse gradually upon switching between the rectification performed by the switching elements and the rectification performed by the rectifying elements.

18 Claims, 25 Drawing Sheets

US 6,778,417 B2

ELECTRIC-POWER SUPPLYING DEVICES SWITCHING BETWEEN A SYNCHRONOUS RECTIFICATION AND A DIODE RECTIFICATION BY GRADUALLY ALTERING A SWITCHING PULSE

BACKGROUND OF THE INVENTION

1. Field of the Invention

The present invention generally relates to an electric-power supplying device, and a control circuit and a controlling method therefor, and more particularly, to an electric-power supplying device comprising switching elements switched according to a switching pulse so as to perform a rectification, and rectifying elements connected in parallel with the switching elements so as to perform a rectification, and a control circuit and a method for controlling the electric-power supplying device.

2. Description of the Related Art

FIG. 1 is a block diagram of an information processing system 1.

The information processing system 1 comprises an alternator 11, an AC-DC converting unit 12, main boards 13-1 to 13-n, and a network 14. The alternator 11 supplies an alternating current voltage (an alternating current) to the AC-DC converting unit 12. The AC-DC converting unit 12 converts the alternating current voltage (the alternating current) into a direct current voltage (a direct current).

The direct current voltage (the direct current) is supplied from the AC-DC converting unit 12 to the main boards 13-1 to 13-n. The main boards 13-1 to 13-n are information processing devices interconnected and intercommunicated via the network 14. Each of the main boards 13-1 to 13-n comprises DC-DC converting units 21-1 to 21-3, a CPU 22, and a storage device 23, and a communication apparatus 24.

The DC-DC converting unit 21-1 generates a predetermined direct current voltage based on the direct current voltage (the direct current) supplied from the AC-DC converting unit 12, and supplies the generated direct current voltage to the CPU 22. The CPU 22 is driven by the direct current voltage supplied from the DC-DC converting unit 21-1 so as to process data. The DC-DC converting unit 21-2 generates a predetermined direct current voltage based on the direct current voltage (the direct current) supplied from the AC-DC converting unit 12, and supplies the generated direct current voltage to the storage device 23. The storage device 23 is driven by the direct current voltage supplied from the DC-DC converting unit 21-2 so as to store the data processed by the CPU 22 and data supplied from the storage device 23. The DC-DC converting unit 21-3 generates a predetermined direct current voltage based on the direct current voltage (the direct current) supplied from the AC-DC converting unit 12, and supplies the generated direct current voltage to the communication apparatus 24. The communication apparatus 24 controls communications with the network 14.

FIG. 2 is a block diagram of the DC-DC converting unit 21-1.

The DC-DC converting unit 21-1 comprises DC-DC converting circuits 31-1 and 31-2, and diodes D1 and D2. The DC-DC converting circuit 31-1 converts the direct current voltage supplied from the AC-DC converting unit 12 into a predetermined voltage. The DC-DC converting circuit 31-1 detects an output current and the output voltage so as regulate the output voltage at a constant level. The output voltage is supplied from the DC-DC converting circuit 31-1 to the CPU 22 via the diode D1. The DC-DC converting circuit 31-2 is arranged in the same manner as the DC-DC converting circuit 31-1 such that the output voltage is supplied from the DC-DC converting circuit 31-2 to the CPU 22 via the diode D2.

In a normal operation, direct currents are supplied from the DC-DC converting circuit 31-1 and the DC-DC converting circuit 31-2 to the CPU 22. Upon rising, when the output voltage of the DC-DC converting circuit 31-1 rises earlier than the output voltage of the DC-DC converting circuit 31-2, the diode D2 keeps the current from flowing from the DC-DC converting circuit 31-1 to the DC-DC converting circuit 31-2. That is, the diode D2 can prevent an adverse current to the DC-DC converting circuit 31-2.

Upon rising, when the output voltage of the DC-DC converting circuit 31-2 rises earlier than the output voltage of the DC-DC converting circuit 31-1, the diode D1 keeps the current from flowing from the DC-DC converting circuit 31-2 to the DC-DC converting circuit 31-1. That is, the diode D1 can prevent an adverse current to the DC-DC converting circuit 31-1.

Next, a more detailed description will be given of the DC-DC converting circuit 31-1 (the DC-DC converting circuit 31-2).

FIG. 3 is a block diagram of the DC-DC converting circuit 31-1.

The DC-DC converting circuit 31-1 comprises an inverter circuit 41, a transformer 42, switching elements (transistors) Q1 and Q2, rectifying elements (diodes) D11 and D12, a control circuit 43, a choke coil L0, an output current detection resistance Rs, and a smoothing capacitor C0.

The direct current voltage is impressed from the AC-DC converting unit 12 to the inverter circuit 41. The inverter circuit 41 converts the direct current voltage impressed from the AC-DC converting unit 12 into an alternating current voltage.

The alternating current voltage converted by the inverter circuit 41 is impressed to a primary coil L1 of the transformer 42. An alternating current in accordance with the alternating current voltage impressed from the inverter circuit 41 flows in the primary coil L1 of the transformer 42 so that a magnetic flux is generated therein in accordance with the flowing current. The magnetic flux generated in the primary coil L1 of the transformer 42 is transmitted to secondary coils L21 and L22 of the transformer 42. A secondary current in accordance with the magnetic flux transmitted from the primary coil L1 flows in the secondary coils L21 and L22.

One end of the secondary coil L21 is grounded via a source and a drain of the transistor Q1, and the other end of the secondary coil L21 is connected to one end of the choke coil L0. One end of the secondary coil L22 is grounded via a source and a drain of the transistor Q2, and the other end of the secondary coil L22 is connected to the one end of the choke coil L0. The transistors Q1 and Q2 are MOS-FETs (Metal-Oxide-Semiconductor field effect transistors), for example.

The transistors Q1 and Q2 have gates connected to the control circuit 43 so as to be switched according to a switching pulse supplied from the control circuit 43. The diode D11 is connected between the source and the drain of the transistor Q1 in parallel. An anode of the diode D11 is grounded via the drain of the transistor Q1, and a cathode of the diode D1 is connected to the secondary coil L21 via the source of the transistor Q1.

The other end of the choke coil L0 is connected to an output terminal Tout via the output current detection resistance Rs. The smoothing capacitor C0 is connected between the output terminal Tout and a ground terminal Tgnd. An electric potential of a node of the secondary coil L21 and the secondary coil L22 is smoothed by the choke coil L0 and the smoothing capacitor C0, and is output via the output terminal Tout.

Voltages at both ends of the output current detection resistance Rs and an output voltage Vout of the output terminal Tout are supplied to the control circuit 43. When the output voltage Vout supplied from the output terminal Tout becomes small, the control circuit 43 reduces a pulse width, or increases cycles, of the switching pulse supplied to the gates of the transistors Q1 and Q2. When the output voltage Vout supplied from the output terminal Tout becomes large, the control circuit 43 enlarges the pulse width, or decreases the cycles, of the switching pulse supplied to the gates of the transistors Q1 and Q2.

Thus, the gates of the transistors Q1 and Q2 are supplied with the switching pulse from the control circuit 43, and the transistors Q1 and Q2 are switched alternately according to the switching pulse supplied from the control circuit 43.

Additionally, the control circuit 43 detects the output current according to the voltages at both ends of the output current detection resistance Rs. When the output current is smaller than a predetermined threshold value, i.e., when a load is light, the control circuit 43 turns off the transistors Q1 and Q2 continually, and performs a diode rectification by using the diodes D11 and D12. Performing the diode rectification eliminates a necessity of performing undue switching so as to reduce electric power loss resulting from the switching.

On the other hand, when the output current is larger than the predetermined threshold value, i.e., when the load is heavy, the transistors Q1 and Q2 are switched according to the switching pulse corresponding to the output voltage Vout so as to perform a synchronous rectification. In performing the synchronous rectification, an on-state voltage of the transistors Q1 and Q2 is approximately 0.01 [V] which is sufficiently small compared to an on-state voltage of the diodes D11 and D12 of approximately 0.7 [V]; accordingly, performing the synchronous rectification alleviates a voltage drop due to the switching elements (the transistors Q1 and Q2) so as to efficiently supply the current to a load (the CPU 22), reducing electric power loss.

However, a conventional electric-power supplying device of a kind as described above (the DC-DC converting circuit 31-1 or the DC-DC converting circuit 31-2) has such problems as a change in output voltage upon switching the synchronous rectification performed by using the switching elements (the transistors Q1 and Q2) and the diode rectification performed by using the rectifying elements (the diodes D11 and D12) according to a difference-in the voltages at both ends of the on-state resistance (the output current detection resistance RS), as shown in FIG. 4.

When applying an electric-power supplying device of this kind to such an apparatus as a computer, a voltage change needs to be restrained below several tens of millivolts. In order to reduce the change in the output voltage shown in FIG. 4, it is necessary to increase an inductance of the choke coil L0 and a capacitance of the smoothing capacitor C0. Increasing the inductance of the choke coil L0 and the capacitance of the smoothing capacitor C0 reduces the change in the output voltage, as indicated by a broken line shown in FIG. 4. However, increasing the inductance of the choke coil L0 and the capacitance of the smoothing capacitor C0 has such problems as enlarging the electric-power supplying device in size, and increasing costs of thereof.

Additionally, in an electric-power supplying system comprising a redundancy of these electric-power supplying devices, each of the diodes D1 and D2 is connected between the output terminal of the electric-power supplying device (the DC-DC converting circuit 31-1 or the DC-DC converting circuit 31-2) and the load (the CPU 22) such that a direction from the electric-power supplying device to the load becomes a forward direction of the diode. This arrangement has such problems as causing a loss due to the diode, and increasing the number of components and costs thereof.

SUMMARY OF THE INVENTION

It is a general object of the present invention to provide an improved and useful electric-power supplying device, and a control circuit and a controlling method therefor, in which the above-mentioned problems are eliminated.

A more specific object of the present invention is to provide an electric-power supplying device capable of supplying electric power efficiently, and a control circuit and a controlling method therefor.

In order to achieve the above-mentioned objects according to the present invention, upon switching between a rectification performed by switching elements switched according to a switching pulse and a rectification performed by rectifying elements connected in parallel with the switching elements, the switching pulse is gradually altered.

According to the present invention, the rectification performed by the switching elements and the rectification performed by the rectifying elements can be smoothly switched so as to reduce a change in an output voltage.

Additionally in the present invention, the rectifying elements may perform the rectification upon turning power supply on, and the switching pulse may be altered gradually after a predetermined period of time elapses since turning the power supply on so as to cause the rectification performed by the rectifying elements to transit gradually to the rectification performed by the switching elements.

According to the present invention, even when a current flows adversely from a load, such as a CPU, upon a rise of an output voltage, the rectifying elements can prevent the adverse current. After the rise of the output voltage, the switching pulse is altered gradually so as to smoothly switch the rectification performed by the rectifying elements to the rectification performed by the switching elements. This smooth switching reduces a change in the output voltage.

Additionally in the present invention, an output current may be detected, and when the detected output current becomes larger than a threshold value, the switching pulse is gradually altered so as to gradually switch the rectification performed by the rectifying elements to the rectification performed by the switching elements.

According to the present invention, when the load is heavy with the large output current, the switching elements exhibiting a small on-state voltage enable an efficient current supply. When the load is light with the small output current, the rectifying elements, which do not switch, perform the rectification. The rectification performed by the rectifying elements prevents electric power loss resulting from undue switching, and enables an efficient current supply to a load, such as a CPU.

Additionally in the present invention, when the detected output current becomes smaller than the threshold value, the rectification performed by the switching elements may be immediately switched to the rectification performed by the rectifying elements.

According to the present invention, the immediate switching prevents an adverse current from a load, such as a CPU, immediately.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of embodiments according to the present invention.

Figure 5:
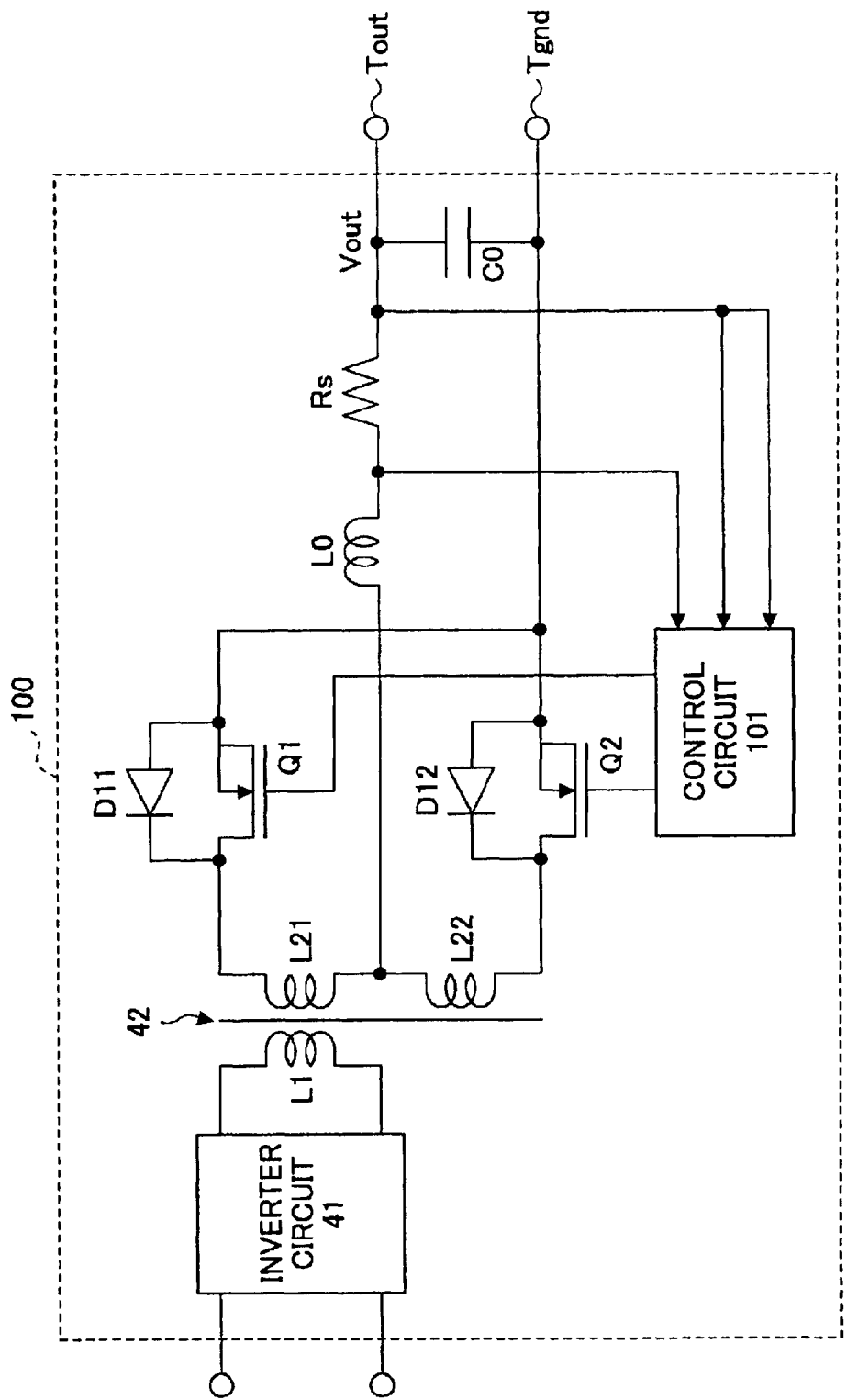
FIG. 5 is a circuit diagram of a DC-DC converting circuit according to a first embodiment of the present invention.

FIG. 5 is a circuit diagram of a DC-DC converting circuit (an electric-power supplying device) 100 according to a first embodiment of the present invention. Elements in FIG. 5 that are identical or equivalent to the elements shown in FIG. 3 are referenced by the same reference marks, and will not be described in detail.

Figure 3:
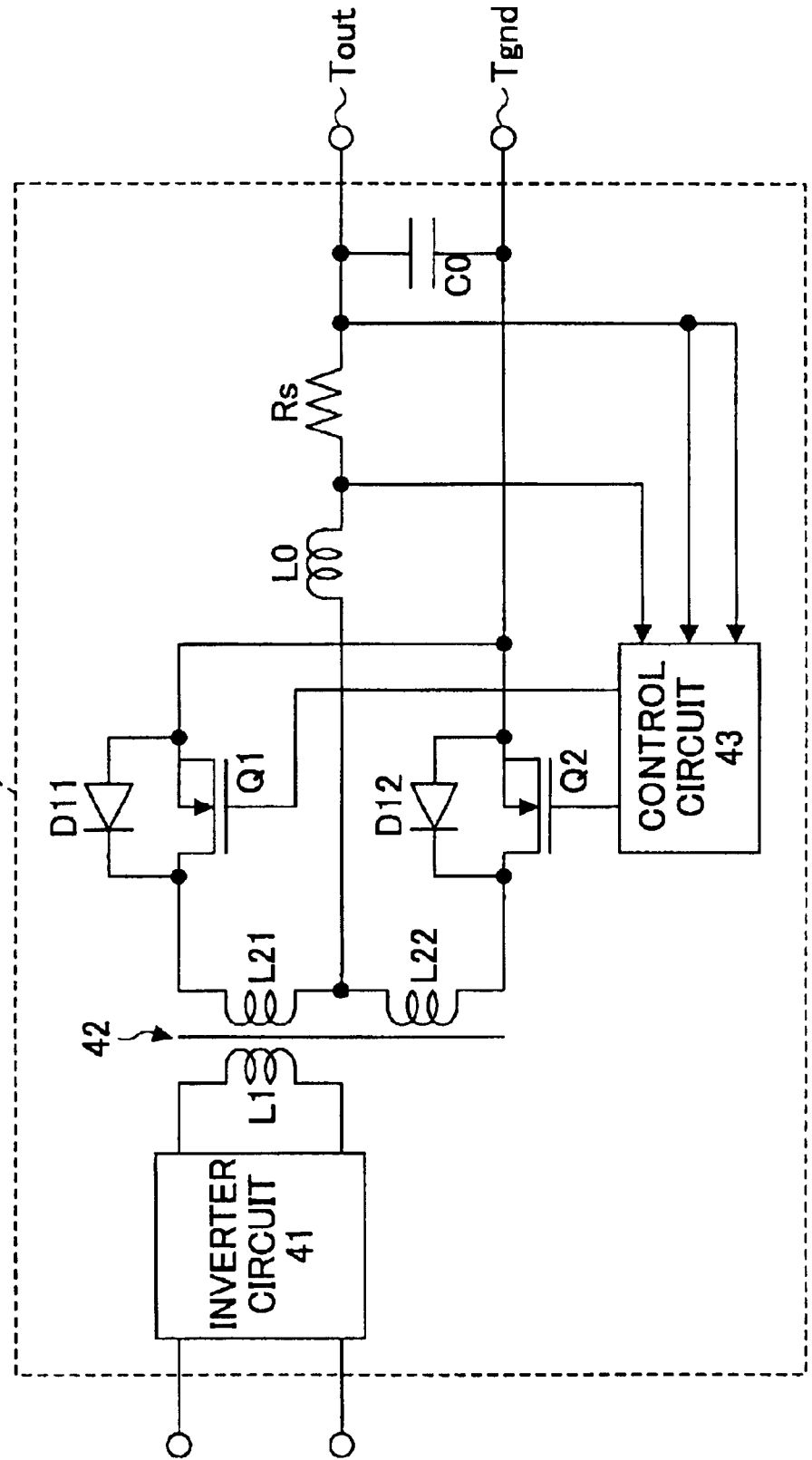
FIG. 3 is a block diagram of a DC-DC converting circuit shown in FIG. 2.
Figure 4:
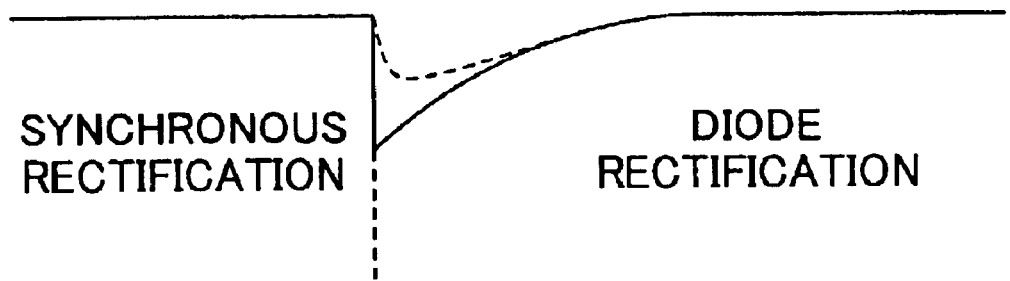
FIG. 4 is a waveform diagram of an output voltage of a conventional electric-power supplying device.

The DC-DC converting circuit 100 is different from the conventional DC-DC converting circuit 31-1 shown in FIG. 3 in that a control circuit 101 has a different structure from the control circuit 43 of the conventional DC-DC converting circuit 31-1.

Figure 6:
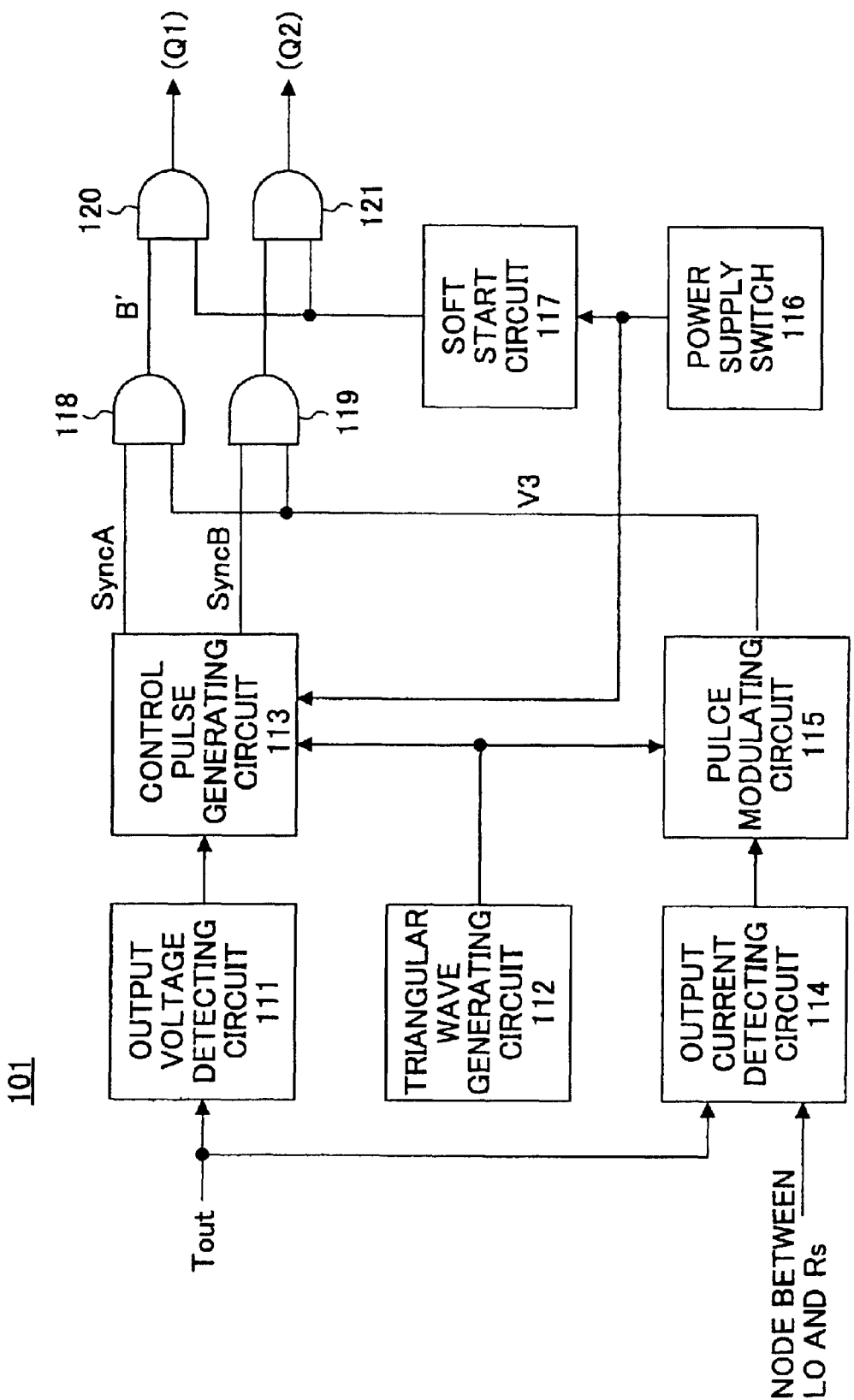
FIG. 6 is a block diagram of a control circuit shown in FIG. 5.

FIG. 6 is a block diagram of the control circuit 101.

The control circuit 101 comprises an output voltage detecting circuit 111, a triangular wave generating circuit 112, a control pulse generating circuit 113, an output current detecting circuit 114, a pulse modulating circuit 115, a power supply switch 116, a soft start circuit 117, and AND gates 118 to 121. Besides, at least the pulse modulating circuit 115 and the soft start circuit 117 correspond to an altering unit.

The output voltage Vout output from the output terminal Tout is impressed to the output voltage detecting circuit 111. The output voltage detecting circuit 111 generates and outputs an analog signal in accordance with a difference between the output voltage Vout and a reference voltage Vref.

Figure 7:
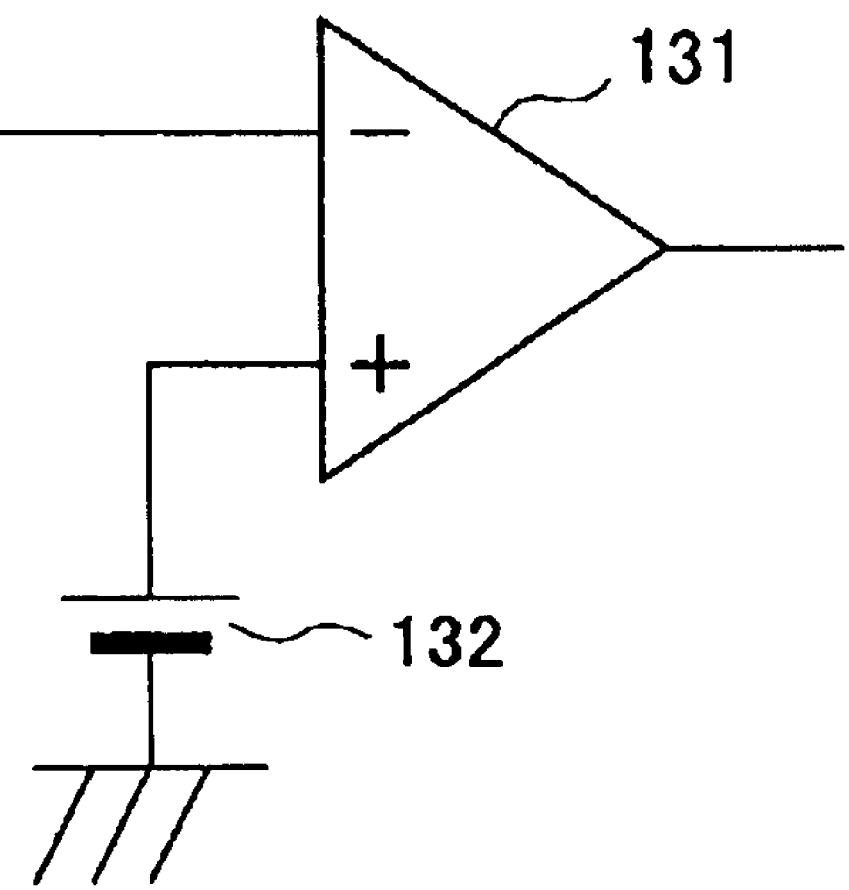
FIG. 7 is a circuit diagram of an output voltage detecting circuit shown in FIG. 6.

FIG. 7 is a circuit diagram of the output voltage detecting circuit 111.

The output voltage detecting circuit 111 comprises an error amplifier 131 and a reference voltage source 132. The output voltage Vout is impressed from the output terminal Tout to an inverting input terminal of the error amplifier 131. The reference voltage Vref is impressed from the reference voltage source 132 to a noninverting input terminal of the error amplifier 131. The error amplifier 131 outputs a signal in accordance with the difference between the output voltage Vout and the reference voltage Vref.

An output signal of the output voltage detecting circuit 111 is supplied to the control pulse generating circuit 113. The control pulse generating circuit 113 is supplied not only with the output signal of the output voltage detecting circuit 111 but also with a triangular wave signal from the triangular wave generating circuit 112. The control pulse generating circuit 113 generates a control pulse based on the output signal supplied from the output voltage detecting circuit 111 and the triangular wave signal supplied from the triangular wave generating circuit 112.

Figure 8:
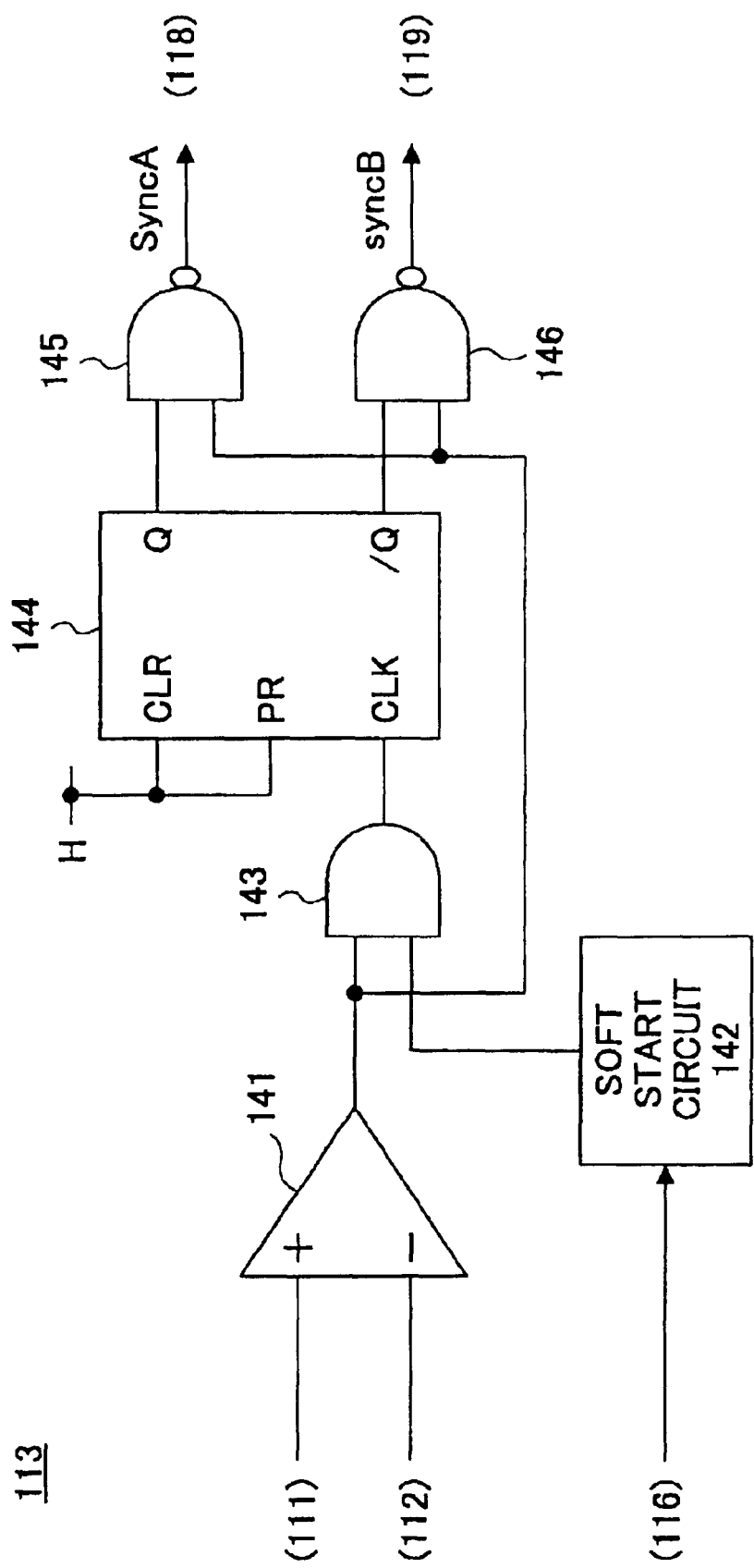
FIG. 8 is a circuit diagram of a control pulse generating circuit shown in FIG. 6.

FIG. 8 is a circuit diagram of the control pulse generating circuit 113.

The control pulse generating circuit 113 comprises a comparator 141, a soft start circuit 142, an AND gate 143, a flip-flop 144, and NAND gates 145 and 146.

The output signal of the output voltage detecting circuit 111 is supplied to a noninverting input terminal of the comparator 141. The triangular wave signal is supplied from the triangular wave generating circuit 112 to an inverting input terminal of the comparator 141. The comparator 141 compares the output signal of the output voltage detecting circuit 111 with the triangular wave signal generated by the triangular wave generating circuit 112. When a level of the output signal of the output voltage detecting circuit 111 is higher than a level of the triangular wave signal generated by the triangular wave generating circuit 112, the comparator 141 makes an output thereof high-level. When the level of the output signal of the output voltage detecting circuit 111 is lower than the level of the triangular wave signal generated by the triangular wave generating circuit 112, the comparator 141 makes the output thereof low-level. The comparator 141 supplies the output to the AND gate 143.

The soft start circuit 142 detects a turning-on of power supply by the power supply switch 116. Upon switching to a soft start, the AND gate 143 is supplied with the output of the comparator 141 and an output of the soft start circuit 142 according to a power supplied from an power supply detecting circuit. The soft start circuit 142 supplies an output signal having a pulse width increasing gradually upon turning the power supply on.

Figure 9:
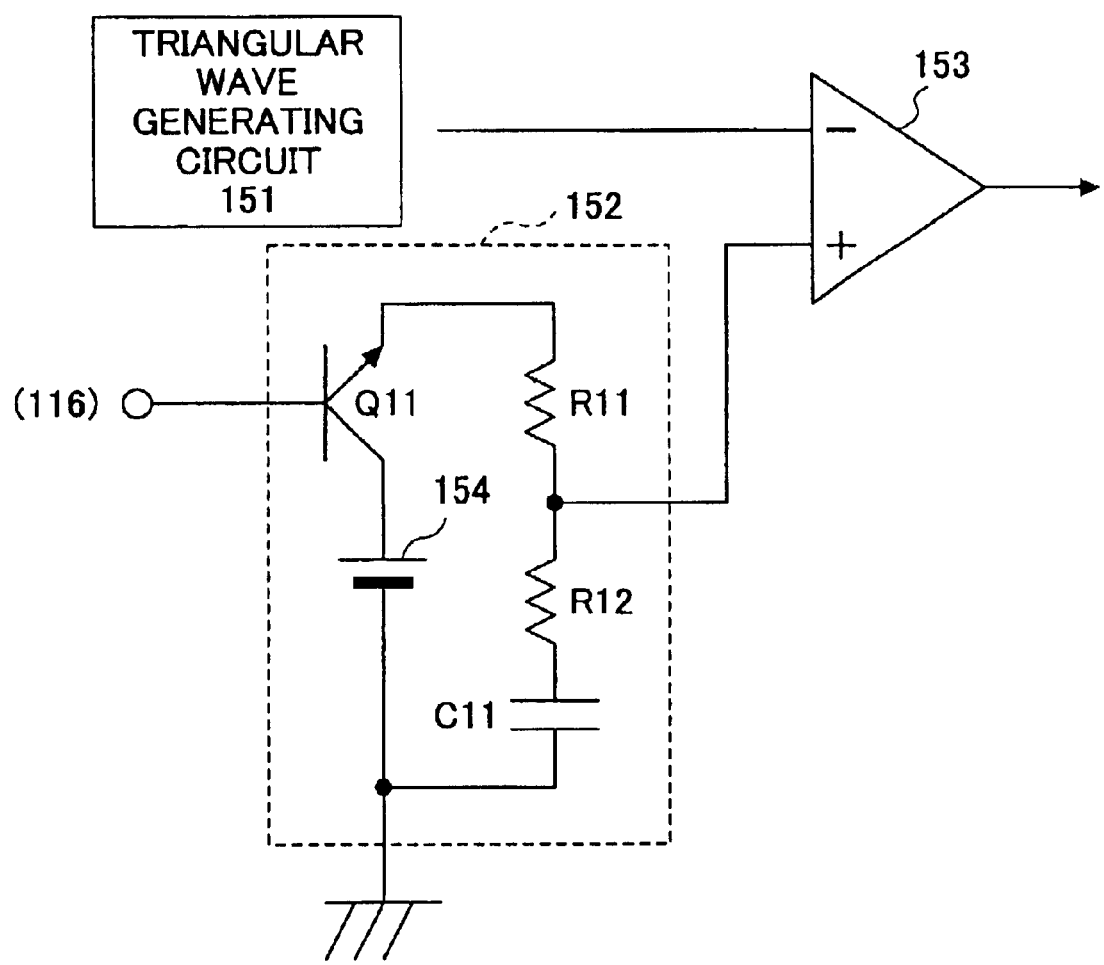
FIG. 9 is a circuit diagram of a soft start circuit shown in FIG. 8.

FIG. 9 is a circuit diagram of the soft start circuit 142.

The soft start circuit 142 comprises a triangular wave generating circuit 151, a delay circuit 152, and a comparator 153. The triangular wave generating circuit 151 generates a triangular wave signal having a frequency lower than a frequency of the triangular wave signal generated by the triangular wave generating circuit 112. The triangular wave signal generated by the triangular wave generating circuit 151 is supplied to an inverting input terminal of the comparator 153.

The delay circuit 152 comprises a voltage source 154, a transistor Q11, resistances R11 and R12, and a capacitor C11. The transistor Q11 is composed of an NPN transistor, and turns on when an output signal of the power supply switch 116 supplied to a base of the transistor Q11 becomes high-level, i.e., upon turning the power supply on.

The capacitor C11 is connected to the voltage source 154 via the resistances R11 and R12 and the transistor Q11. When the transistor Q11 turns on, the capacitor C11 is supplied with a current via the resistances R11 and R12 so as to be charged therewith. A charge voltage of the capacitor C11 is divided by the resistances R11 and R12, and is supplied to a noninverting input terminal of the comparator 153.

Figure 10:
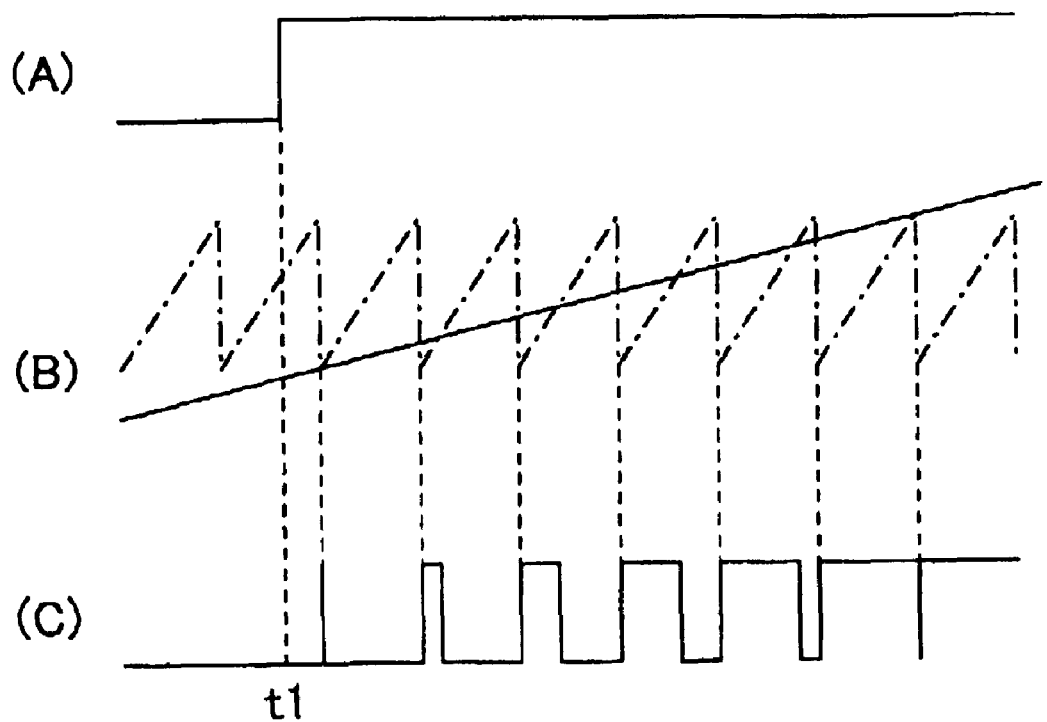
FIG. 10 is a waveform diagram representing operations of the soft start circuit shown in FIG. 9.

FIG. 10 is a waveform diagram representing operations of the soft start circuit 142. FIG. 10-(A) indicates the output signal of the power supply switch 116. FIG. 10-(B) indicates a voltage at a node of the resistances R11 and R12 by a solid line therein, and indicates the triangular wave signal of the triangular wave generating circuit 151 by a dashed chain line therein. FIG. 10-(C) indicates an output of the comparator 153.

When the power supply switch 116 is turned on at a time t1, the output signal of the power supply switch 116 rises from low-level to high-level. Thereupon, a potential at the node of the resistances R11 and R12 increases gradually in accordance with a time constant determined according to the resistances R11 and R12 and the capacitor C11.

The comparator 153 compares the voltage at the node of the resistances R11 and R12 indicated in FIG. 10-(B) by the solid line with the triangular wave signal indicated in FIG. 10-(B) by the dashed chain line. When the voltage at the node of the resistances R11 and R12 indicated in FIG. 10-(B) by the solid line is larger than the triangular wave signal indicated in FIG. 10-(B) by the dashed chain line, the comparator 153 makes the output thereof high-level so as to output an output pulse signal having a pulse width increasing gradually as indicated by FIG. 10-(C). The output signal of the comparator 153 indicated by FIG. 10-(C) is supplied to the AND gate 143. The AND gate 143 obtains an AND-logic product of the output of the comparator 141 and the output of the soft start circuit 142.

An output of the AND gate 143 is supplied to a clock terminal CLK of the flip-flop 144. A clear terminal CLR and a preset terminal PR of the flip-flop 144 are fixed at high levels. Accordingly, the flip-flop 144 inverts a noninverted output Q and an inverted output /Q according to a rise of the output pulse of the AND gate 143 supplied to the clock terminal CLK. The noninverted output Q of the flip-flop 144 is supplied to the NAND gate 145, and the inverted output /Q of the flip-flop 144 is supplied to the NAND gate 146.

The NAND gate 145 obtains a NAND-logic product of the noninverted output Q of the flip-flop 144 and the output of the comparator 141. An output (control pulse SyncA) of the NAND gate 145 is supplied to the AND gate 118. The NAND gate 146 obtains a NAND-logic product of the inverted output /Q of the flip-flop 144 and the output of the comparator 141. An output (control pulse SyncB) of the NAND gate 146 is supplied to the AND gate 119.

The AND gate 118 outputs an AND-logic product of the output (the control pulse SyncA) of the NAND gate 145 and an output of the pulse modulating circuit 115. The AND gate 119 outputs an AND-logic product of the output (the control pulse SyncB) of the NAND gate 146 and the output of the pulse modulating circuit 115.

Here, a description will be given of the pulse modulating circuit 115.

Figure 11:
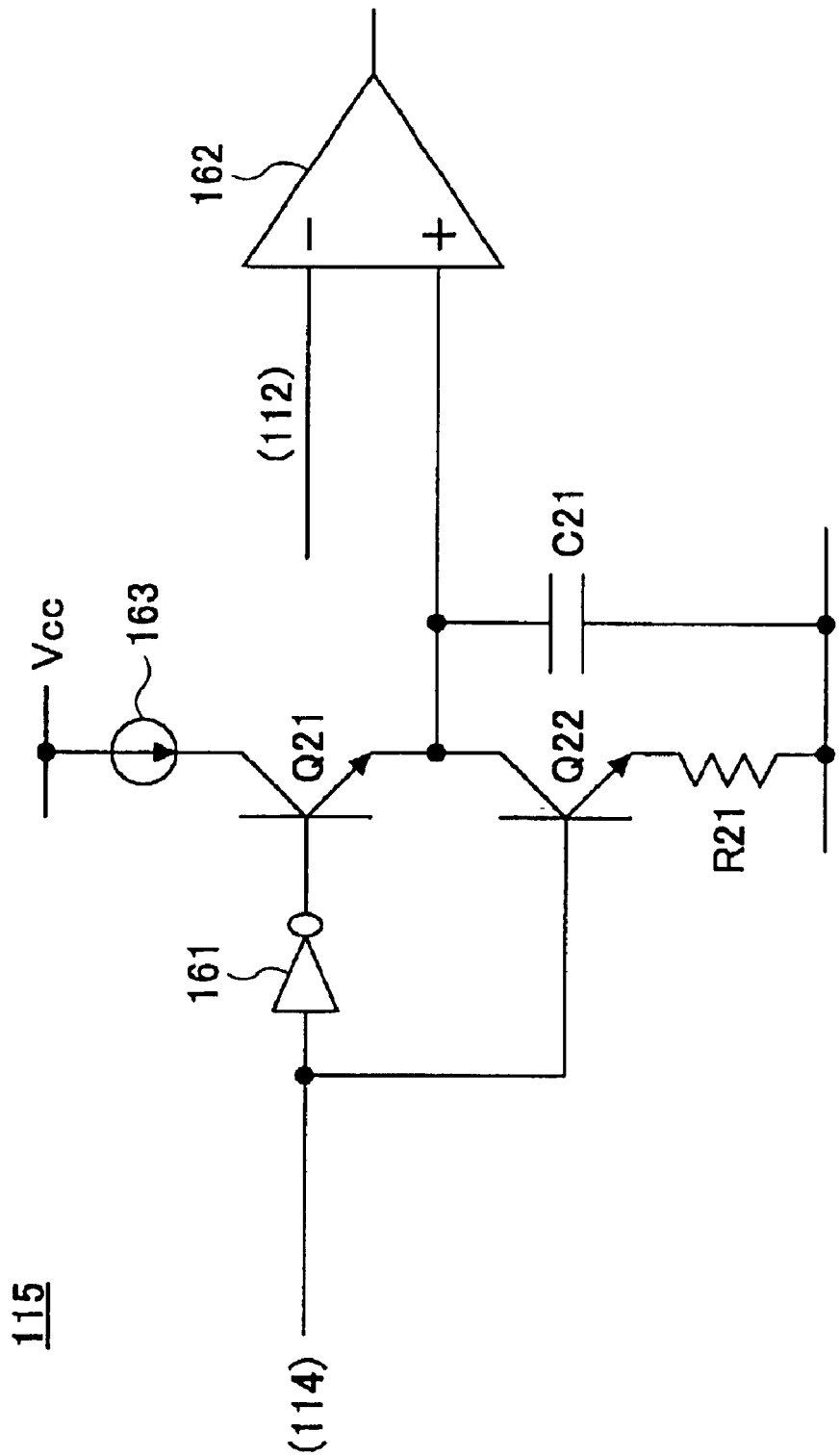
FIG. 11 is a circuit diagram of a pulse modulating circuit shown in FIG. 6.

FIG. 11 is a circuit-diagram of the pulse modulating circuit 115.

The pulse modulating circuit 115 comprises an inverter 161, transistors Q21 and Q22, a capacitor C21, a comparator 162, a current source 163, and a resistance R21. The pulse modulating circuit 115 is supplied with a detection signal from the output current detecting circuit 114.

Figure 12:
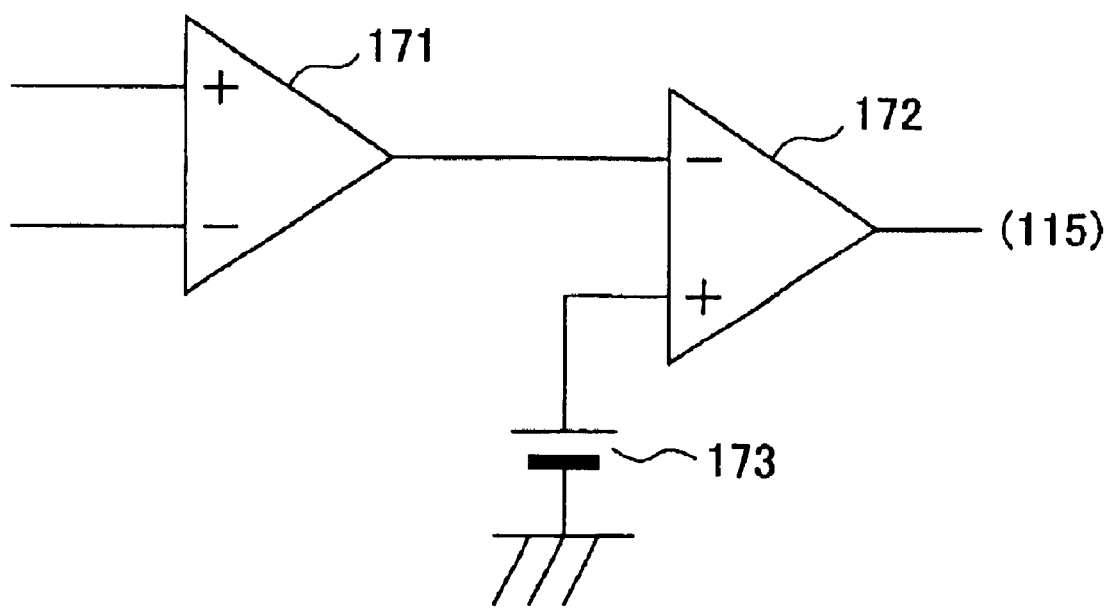
FIG. 12 is a circuit diagram of an output current detecting circuit 114 shown in FIG. 6.
Figure 13:
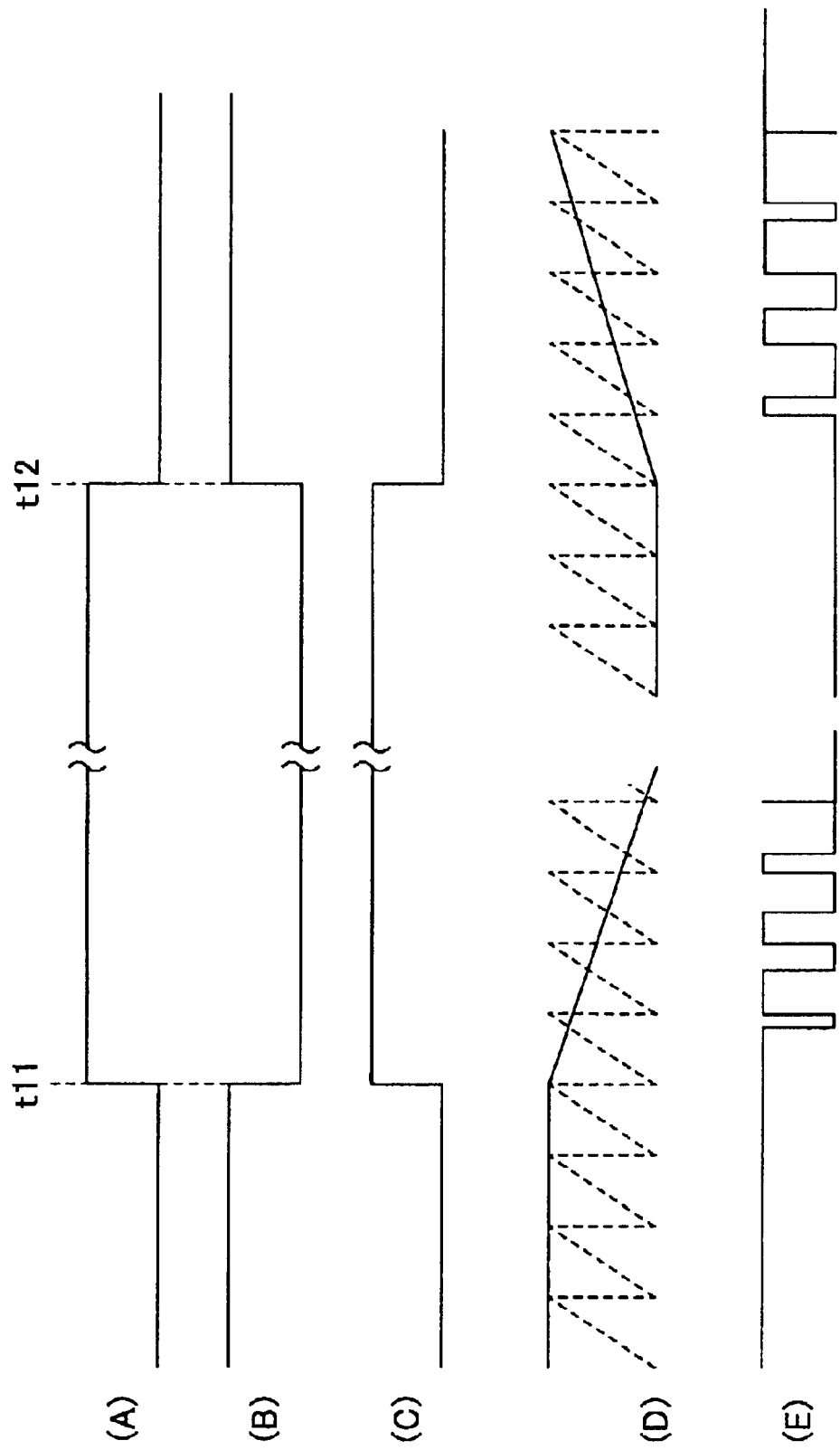
FIG. 13 is a waveform diagram representing operations of the pulse modulating circuit shown in FIG. 11.

FIG. 12 is a circuit diagram of the output current detecting circuit 114. FIG. 13 is a waveform diagram representing operations of the pulse modulating circuit 115. FIG. 13-(A) indicates an output of the output current detecting circuit 114. FIG. 13-(B) indicates a base voltage of the transistor Q21. FIG. 13-(C) indicates a base voltage of the transistor Q22. FIG. 13-(D) indicates a charge voltage of the capacitor C21 and the triangular wave signal output from the triangular wave generating circuit 112. FIG. 13-(E) indicates an output of the comparator 162.

As shown in FIG. 12, the output current detecting circuit 114 comprises a differential amplifier 171, a comparator 172, and a reference voltage source 173.

The differential amplifier 171 detects a potential difference between both ends of the output current detection resistance Rs shown in FIG. 5. An output of the differential amplifier 171 is supplied to an inverting input terminal of the comparator 172.

A reference voltage is impressed from the reference voltage source 173 to a noninverting input terminal of the comparator 172. When the output of the differential amplifier 171 is smaller than the reference voltage, i.e., when a load is light, the comparator 172 makes an output thereof high-level. When the output of the differential amplifier 171 is larger than the reference voltage, i.e., when a load is heavy, the comparator 172 makes the output thereof low-level.

The output of the comparator 172 is supplied to the pulse modulating circuit 115. In the pulse modulating circuit 115, the output of the comparator 172 is supplied to a base of the NPN transistor Q22, and is supplied to a base of the NPN transistor Q21 via the inverter 161.

When the load is light, i.e., when the output of the comparator 172 is high-level, the base of the transistor Q21 is at a low level, and the base of the transistor Q22 is at a high level, such that the transistor Q21 turns off, and the transistor Q22 turns on.

When the transistor Q22 turns on, the capacitor C21 is discharged such that a noninverting input terminal of the comparator 162 becomes low-level. The triangular wave signal is supplied from the triangular wave generating circuit 112 to an inverting input terminal of the comparator 162. When the triangular wave signal is larger than the charge voltage of the capacitor C21, the comparator 162 makes the output thereof low-level. When the triangular wave signal is smaller than the charge voltage of the capacitor C21, the comparator 162 makes the output thereof high-level. That is, when the load is light, the charge voltage of the capacitor C21 is low-level, and is smaller than the triangular wave signal, such that the output of the comparator 162 becomes low-level.

More specifically, with reference to FIG. 13, at a time t11 transiting from the heavy load to the light load, the output of the comparator 172 of the output current detecting circuit 114 changes from low-level to high-level, as indicated by FIG. 13-(A). At this point, the base of the transistor Q21 changes from high-level to low-level, as indicated by FIG. 13-(B), and the base of the transistor Q22 changes from low-level to high-level, as indicated by FIG. 13-(C), such that the transistor Q21 turns off, and the transistor Q22 turns on.

When the transistor Q21 turns off, and the transistor Q22 turns on, the capacitor C21 is discharged gradually via the resistance R21. In this course, the charge voltage of the capacitor C21 changes as indicated by a solid line in FIG. 13-(D).

The charge voltage of the capacitor C21 is supplied to the noninverting input terminal of the comparator 162. Accordingly, as indicated by FIG. 13-(E), high-level periods of the output of the comparator 162 gradually become shorter, and low-level periods of the output of the comparator 162 gradually become longer such that the output of the comparator 162 eventually becomes low-level.

On the contrary, at a time t12 transiting from the light load to the heavy load, i.e., when the output of the comparator 172 changes from high-level to low-level, as indicated by FIG. 13-(A), the base of the transistor Q21 changes from low-level to high-level, as indicated by FIG. 13-(B), and the base of the transistor Q22 changes from high-level to low-level, as indicated by FIG. 13-(C), such that the transistor Q21 turns on, and the transistor Q22 turns off.

When the transistor Q21 turns on, and the transistor Q22 turns off, the capacitor C21 is supplied with a constant current from the current source 163 to be charged gradually. Thereby, the charge voltage of the capacitor C21 increases as indicated by a solid line in FIG. 13-(D).

Accordingly, as indicated by FIG. 13-(E), low-level periods of the output of the comparator 162 gradually become shorter, and high-level periods of the output of the comparator 162 gradually become longer such that the output of the comparator 162 eventually becomes high-level.

As described above, when transiting from the heavy load to the light load, and from the light load to the heavy load, and accordingly, when transiting from the synchronous rectification to the diode rectification, and from the diode rectification to the synchronous rectification, the output of the comparator 162 does not change abruptly from high-level to low-level, or low-level to high-level, but the high-level periods or the low-level periods thereof gradually become shorter, and the low-level periods or the high-level periods thereof gradually become longer.

The output (modulated pulse) of the comparator 162 is supplied to the AND gates 118 and 119. The AND gate 118 outputs the AND-logic product of the control pulse SyncA generated in the control pulse generating circuit 113 and the output of the comparator 162 of the pulse modulating circuit 115. The AND gate 119 outputs the AND-logic product of the control pulse SyncB generated in the control pulse generating circuit 113 and the output of the comparator 162 of the pulse modulating circuit 115. In other words, the AND gates 118 and 119 output the control pulses SyncA and SyncB during the high-level periods of the output of the comparator 162.

The output of the AND gate 118 is supplied to the AND gate 120, and the output of the AND gate 119 is supplied to the AND gate 121. The AND gates 120 and 121 are supplied with an output of the soft start circuit 117. The AND gate 120 outputs an AND-logic product of the output of the AND gate 118 and the output of the soft start circuit 117. The AND gate 121 outputs an AND-logic product of the output of the AND gate 119 and the output of the soft start circuit 117.

The soft start circuit 117 has substantially the same structure as the soft start circuit 142 shown in FIG. 9, except that the capacitor C11 has a larger capacitance in the soft start circuit 117 than in the soft start circuit 142.

Figure 14:
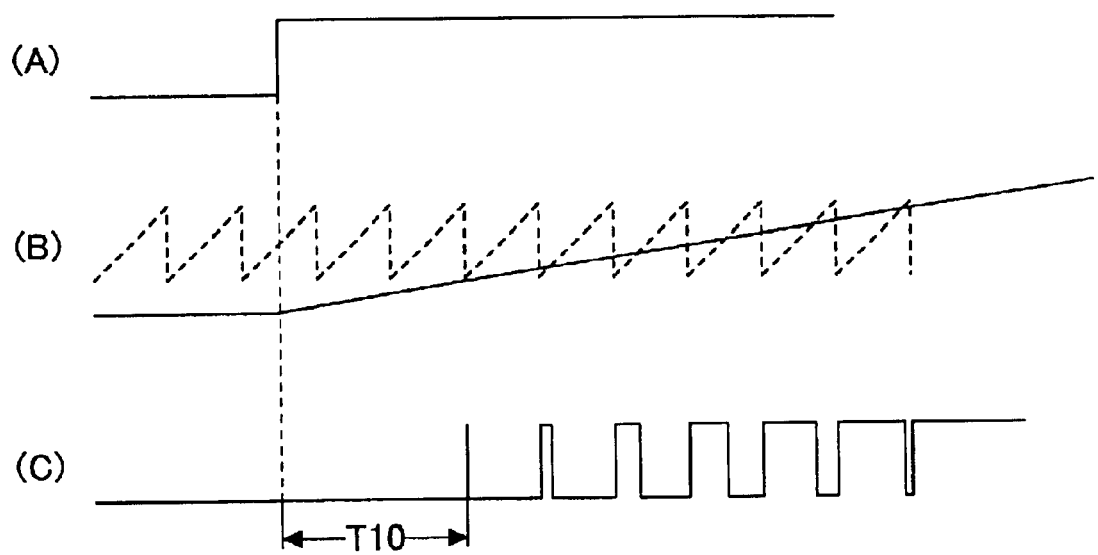
FIG. 14 is a waveform diagram representing operations of a soft start circuit shown in FIG. 6.

FIG. 14 is a waveform diagram representing operations of the soft start circuit 117. FIG. 14-(A) indicates the output of the power supply switch 116. FIG. 14-(B) indicates the charge voltage of the capacitor C11 by a solid line therein, and indicates the triangular wave signal of the triangular wave generating circuit 151 by a broken line therein. FIG. 14-(C) indicates the output of the comparator 153.

Providing the soft start circuit 117 with the capacitor C11 having the larger capacitance delays a rise of the charge voltage of the capacitor C11. Accordingly, the comparator 153 starts making the output thereof high-level a predetermined period of time T10 after the power supply is turned on by the power supply switch 116. In this course, as indicated by FIG. 14-(C), high-level periods of the output of the comparator 153 gradually become longer, and low-level periods of the output of the comparator 153 gradually become shorter such that the output of the comparator 153 is eventually fixed at high-level.

The AND gate 120 outputs the output of the AND gate 118 to the gate of the transistor Q1 when the output of the comparator 153 of the soft start circuit 117 is high-level. The AND gate 121 outputs the output of the AND gate 119 to the gate of the transistor Q2 when the output of the comparator 153 of the soft start circuit 117 is high-level.

Upon turning the power supply on, the outputs of the AND-gates 120 and 121 are maintained at low-level by the soft start circuit 117 so that the transistors Q1 and Q2 are kept off until the predetermined period of time T10 elapses. The transistors Q1 and Q2 halt the synchronous rectification, and instead, the diodes D11 and D12 perform the diode rectification so as to supply power.

Figure 1:
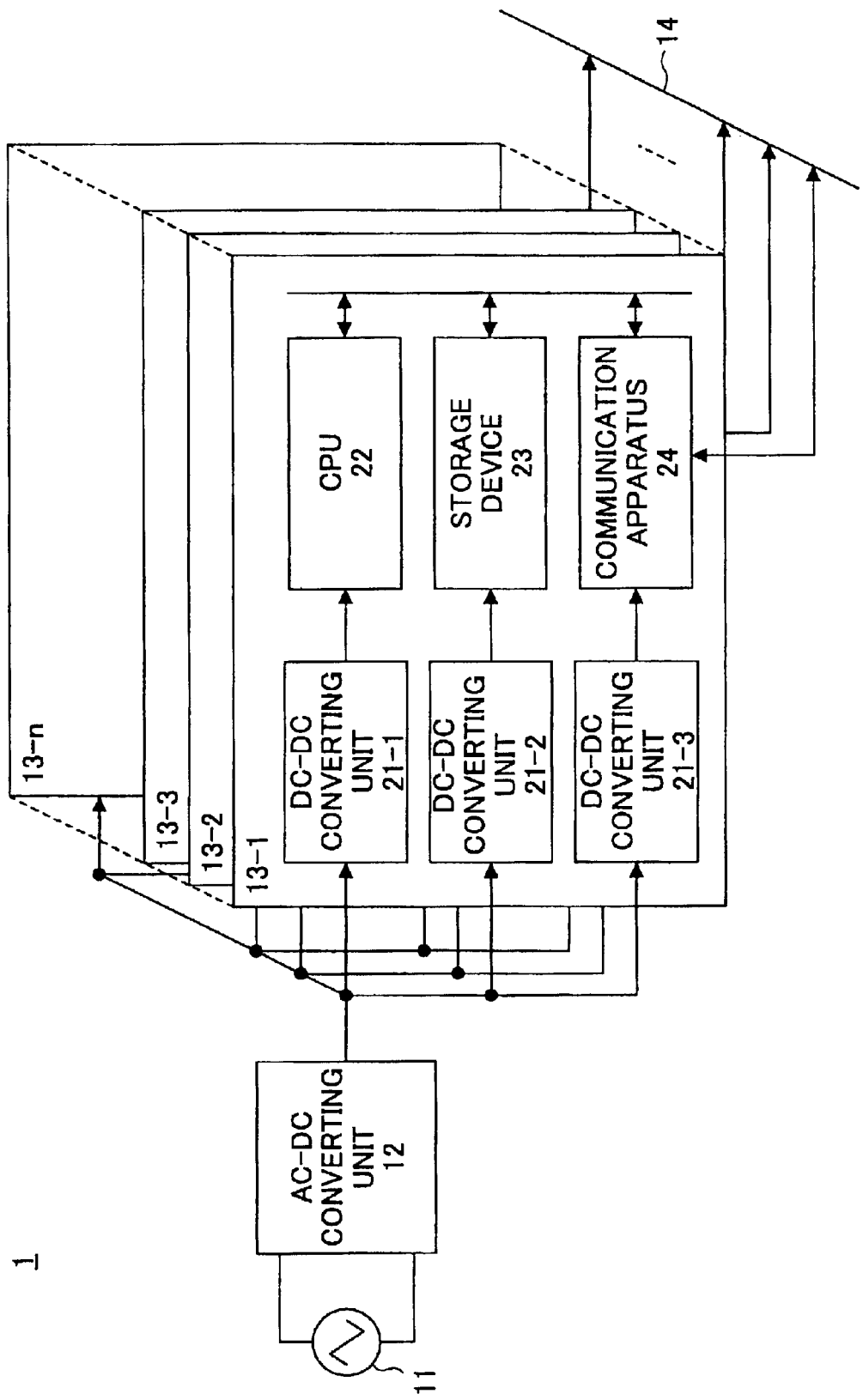
FIG. 1 is a block diagram of an information processing system.
Figure 2:
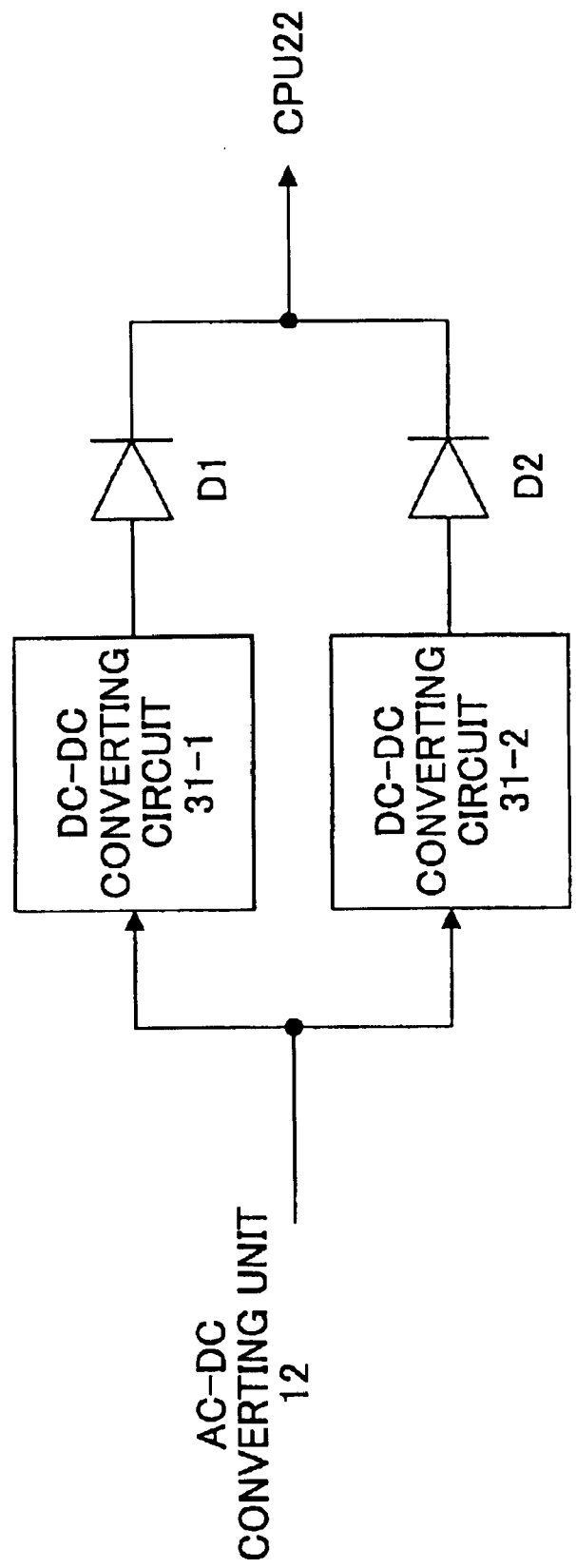
FIG. 2 is a block diagram of a DC-DC converting unit shown in FIG. 1.

Thus, the diodes D11 and D12 perform the diode rectification for the predetermined period of time T10 upon turning the power supply on. Accordingly, even when an output voltage of another electric-power supplying device performing a redundancy of power supply to the load (e.g. the CPU 22 shown in FIG. 1) rises before the output voltage Vout output from the output terminal Tout of the DC-DC converting circuit 100 rises sufficiently, the transformer 42 can prevent an adverse current because of the reversely connected diodes D11 and D12. Therefore, the diodes D1 and D2 connected between the load (the CPU 22) and each of the DC-DC converting circuits 31-1 and 31-2 shown in FIG. 2 become unnecessary so as to realize a simplified circuit structure and a reduced manufacturing cost.

In addition, after the predetermined period of time T10 elapses, the diode rectification is switched gradually to the synchronous rectification by the soft start circuit 117 and the AND gates 120 and 121. Accordingly, even when the on-state voltage of the diodes D11 and D12 and the on-state voltage of the transistors Q1 and Q2 are largely different from each other, switching the diode rectification smoothly to the synchronous rectification can minimize an influence of the switching exerted on the output voltage Vout. Additionally, minimizing the influence exerted on the output voltage Vout allows the choke coil L0 and the smoothing capacitor C0 to be small.

Further, the pulse modulating circuit 115 according to the present first embodiment smoothly switches the diode rectification to the synchronous rectification, or the synchronous rectification to the diode rectification, by gradually changing pulse widths (low-level or high-level periods) of the output signal thereof. Alternatively, the pulse modulating circuit 115 may perform the switching by gradually changing pulse frequencies of the output signal.

Figure 15:
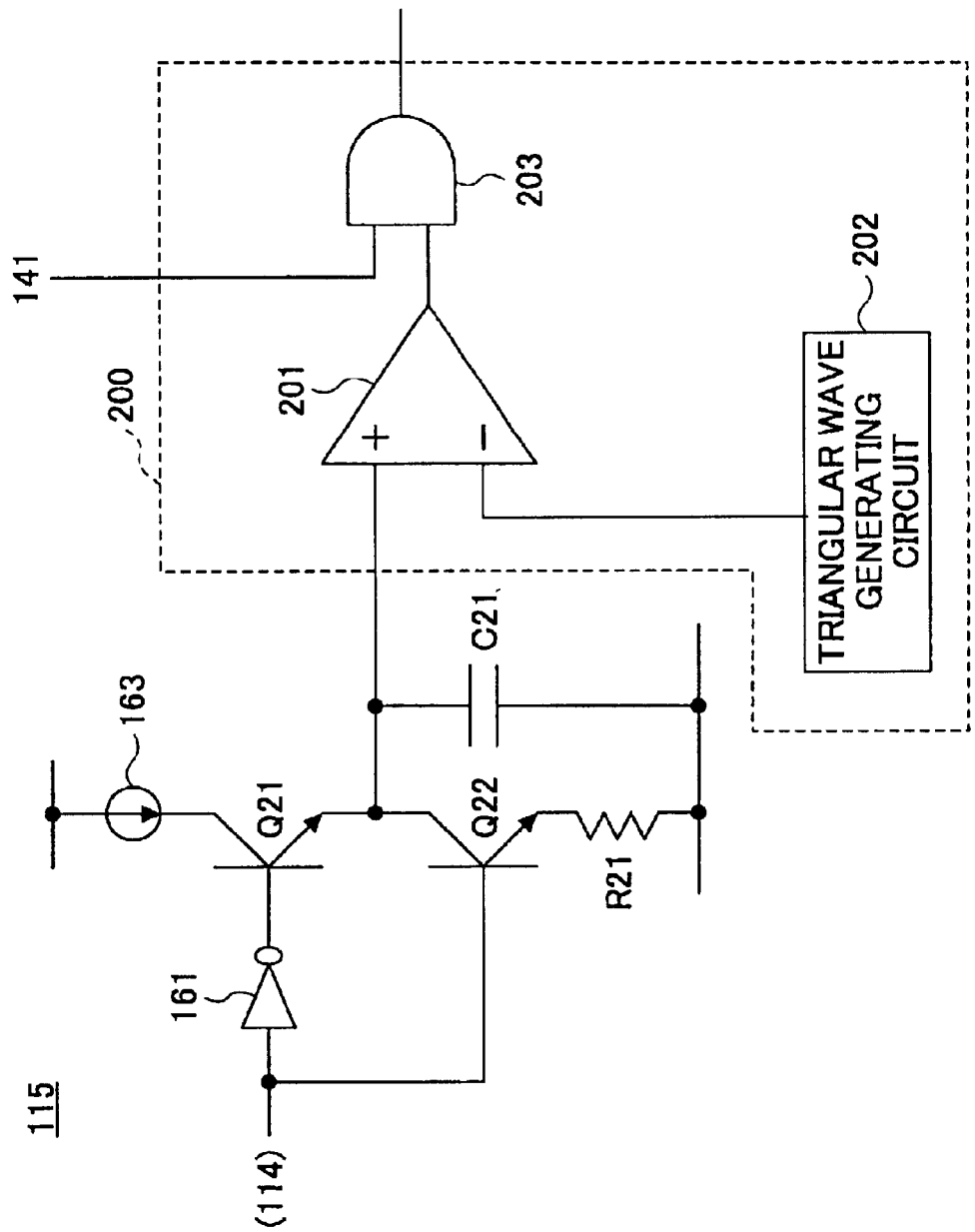
FIG. 15 is a circuit diagram of a first variation of the pulse modulating circuit shown in FIG. 11.

FIG. 15 is a circuit diagram of a first variation of the pulse modulating circuit 115. Elements in FIG. 15 that are identical or equivalent to the elements shown in FIG. 11 are referenced by the same reference marks, and will not be described in detail.

The pulse modulating circuit 115 according to the present first variation comprises a frequency modulation circuit 200 in place of the comparator 162. The frequency modulation circuit 200 comprises a comparator 201, a triangular wave generating circuit 202, and an AND gate 203.

Figure 16:
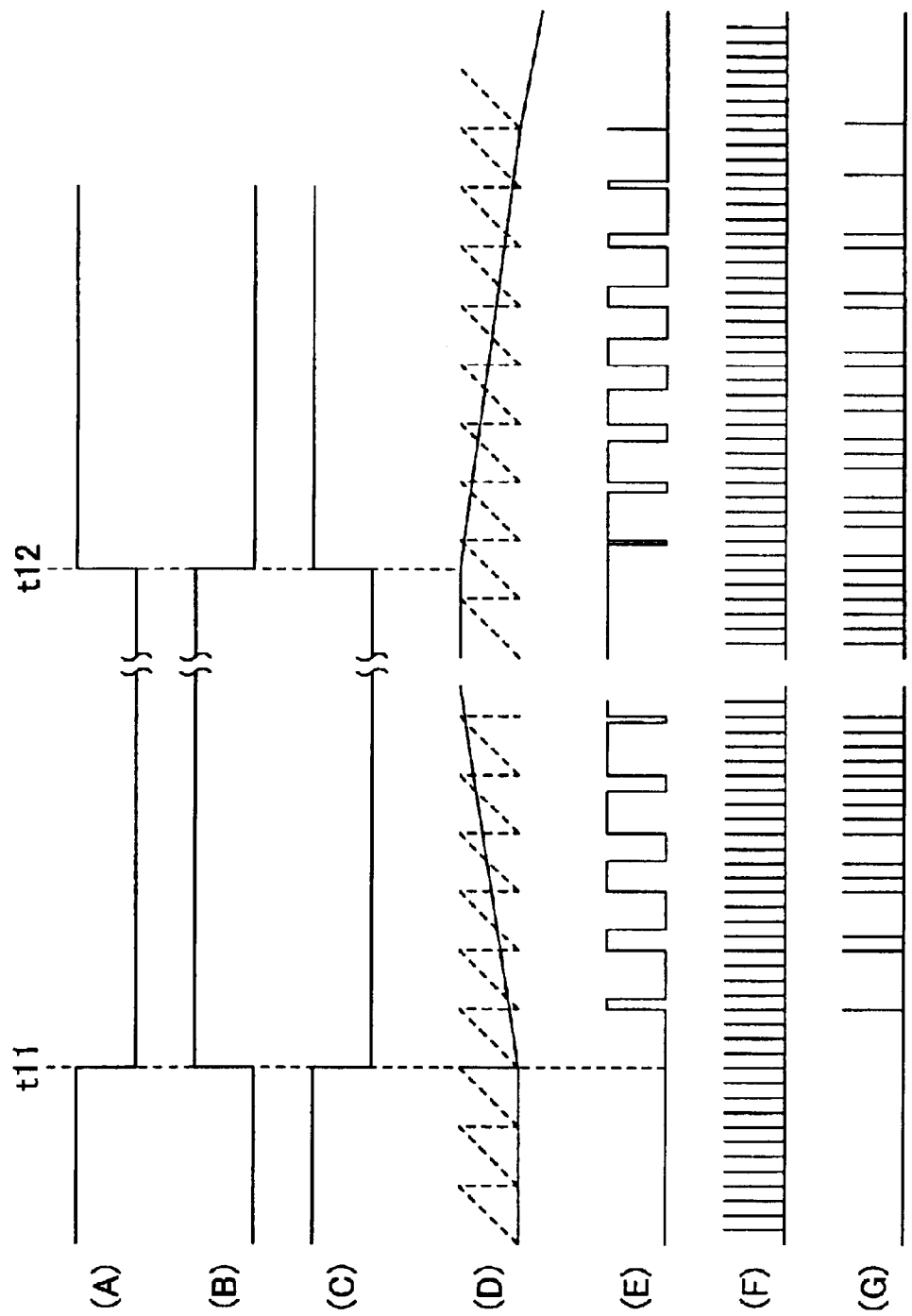
FIG. 16 is a waveform diagram representing operations of the pulse modulating circuit shown in FIG. 15.

FIG. 16 is a waveform diagram representing operations of the pulse modulating circuit 115 according to the present first variation. FIG. 16-(A) indicates the output of the output current detecting circuit 114. FIG. 16-(B) indicates the base voltage of the transistor Q21. FIG. 16-(C) indicates the base voltage of the transistor Q22. FIG. 16-(D) indicates the charge voltage of the capacitor C21 by a solid line, and indicates a triangular wave signal output from the triangular wave generating circuit 202 by a broken line. FIG. 16-(E) indicates an output of the comparator 201. FIG. 16-(F) indicates the output of the comparator 141 of the control pulse generating circuit 113. FIG. 16-(G) indicates an output of the AND gate 203.

The charge voltage of the capacitor C21 is impressed to a noninverting input terminal of the comparator 201. The triangular wave signal is supplied from the triangular wave generating circuit 202 to an inverting input terminal of the comparator 201.

Upon transiting from the light load to the heavy load, the output of the output current detecting circuit 114 changes from high-level to low-level, as indicated by FIG. 16-(A). When the output of the output current detecting circuit 114 becomes low-level, the base of the transistor Q21 becomes high-level, as indicated by FIG. 16-(B), such that the transistor Q21 turns on. Also, when the output of the output current detecting circuit 114 becomes low-level, the base of the transistor Q22 becomes low-level, as indicated by FIG. 16-(C), such that the transistor Q22 turns off.

When the transistor Q21 is on, the capacitor C21 is charged by the current source 163 such that the charge voltage of the capacitor C21 increases as indicated by the solid line in FIG. 16-(D). The comparator 201 compares the charge voltage of the capacitor C21 with the triangular wave signal output from the triangular wave generating circuit 202. It is noted that the triangular wave signal output from the triangular wave generating circuit 202 has a frequency sufficiently lower than the frequency of the triangular wave signal generated by the triangular wave generating circuit 112.

The comparator 201 outputs a signal that becomes high-level when the charge voltage of the capacitor C21 is larger than the triangular wave signal output from the triangular wave generating circuit 202, and becomes low-level when the charge voltage of the capacitor C21 is smaller than the triangular wave signal output from the triangular wave generating circuit 202, as indicated by FIG. 16-(E). The output of the comparator 201 is supplied to the AND gate 203. The AND gate 203 outputs an AND-logic product of the output of the comparator 201 and the output of the comparator 141 of the control pulse generating circuit 113 indicated by FIG. 16-(F). As indicated by FIG. 16-(G), the AND gate 203 outputs the output signal of the comparator 141 of the control pulse generating circuit 113 indicated by FIG. 16-(F) during high-level periods of the output of the comparator 201. Upon transiting from the light load to the heavy load, the high-level periods of the output of the comparator 201 gradually become longer such that the number of output pulses of the comparator 141 of the control pulse generating circuit 113 output from the AND gate 203 increases. That is, a frequency of the output of the AND gate 203 becomes higher such that the output of the AND gate 203 eventually equals the output of the comparator 141 of the control pulse generating circuit 113.

Conversely, upon transiting from the heavy load to the light load, the high-level periods of the output of the comparator 201 gradually become shorter such that the number of output pulses of the comparator 141 of the control pulse generating circuit 113 output from the AND gate 203 gradually decreases. That is, the frequency of the output of the AND gate 203 becomes lower such that the output of the AND gate 203 is eventually maintained at low-level.

As described above, upon transiting from the light load to the heavy load, and from the heavy load to the light load, the pulses can be gradually supplied to the gates of the transistors Q1 and Q2 so as to cause the diode rectification to transit smoothly to the synchronous rectification, and cause the synchronous rectification to transit smoothly to the diode rectification.

In the present invention, although the synchronous rectification is caused to transit smoothly to the diode rectification upon transiting from the heavy load to the light load, this may possibly cause an adverse current from the load (the CPU 22) in the light-load state. To prevent this, upon transiting from the heavy load to the light load, the synchronous rectification may be caused to transit immediately to the diode rectification.

Figure 17:
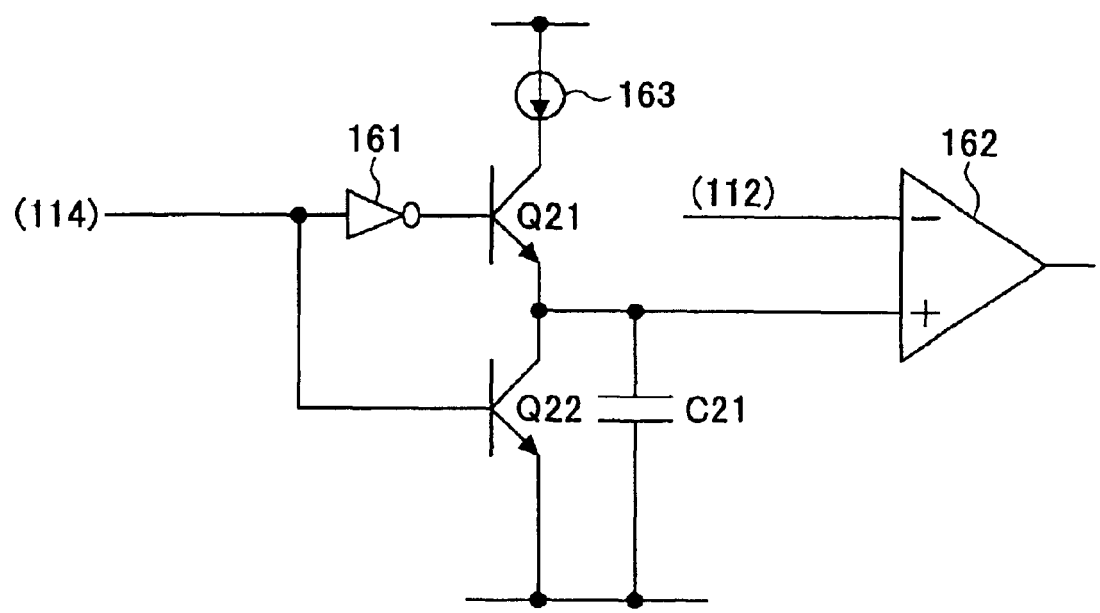
FIG. 17 is a circuit diagram of a second variation of the pulse modulating circuit shown in FIG. 11.
Figure 18:
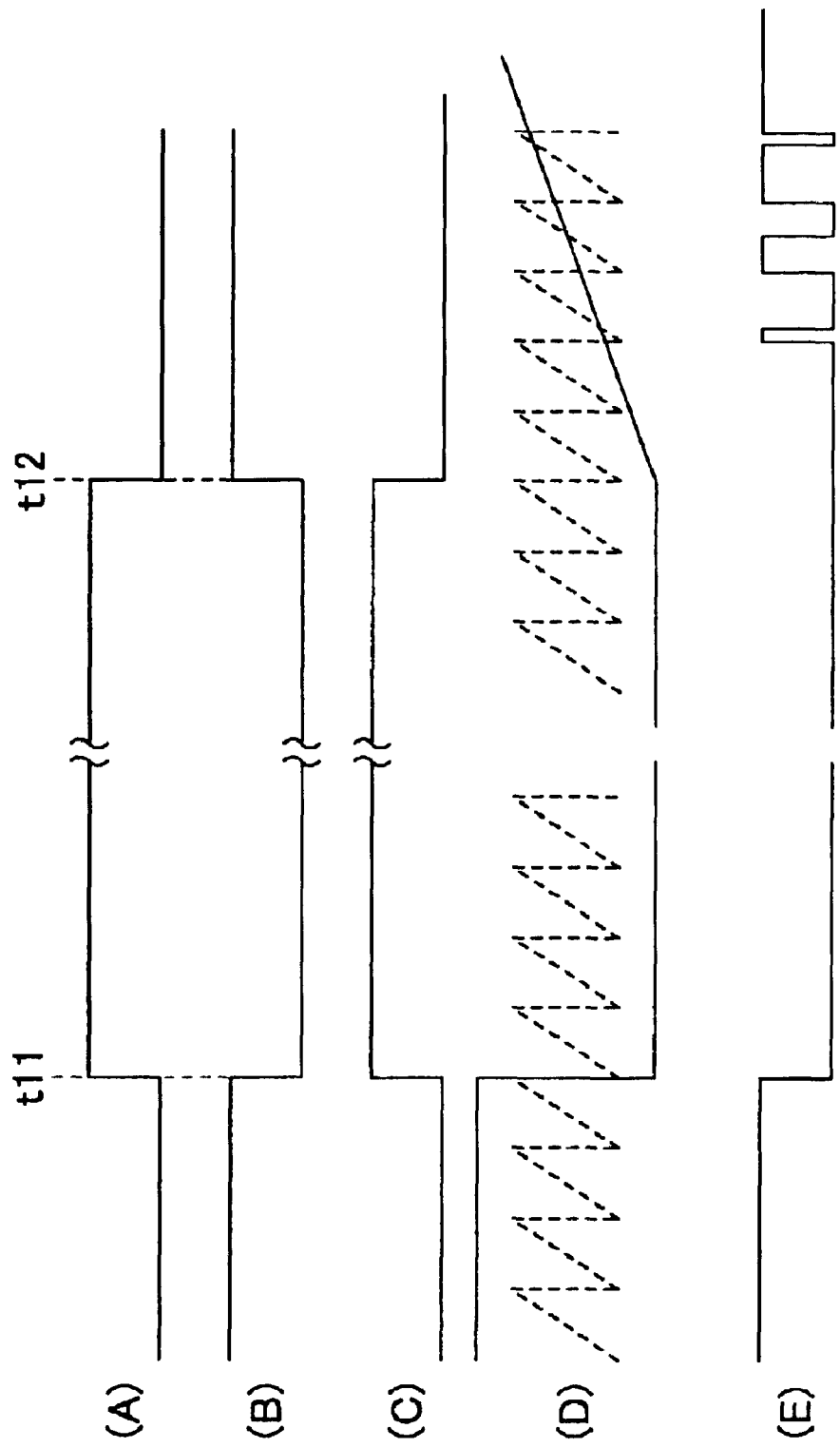
FIG. 18 is a waveform diagram representing operations of the pulse modulating circuit shown in FIG. 17.

FIG. 17 is a circuit diagram of a second variation of the pulse modulating circuit 115. Elements in FIG. 17 that are identical or equivalent to the elements shown in FIG. 11 are referenced by the same reference marks, and will not be described in detail. FIG. 18 is a waveform diagram representing operations of the pulse modulating circuit 115 according to the present second variation. FIG. 18-(A) to FIG. 18-(E) correspond to FIG. 13-(A) to FIG. 13-(E).

The pulse modulating circuit 115 according to the present second variation excludes the resistance R21 resisting a current discharged from the capacitor C21. At a time t11 in FIG. 18, when the transistor Q22 turns on, the capacitor C21 is discharged immediately so that the charge voltage of the capacitor C21 decreases sharply as indicated by a solid line in FIG. 18-(D). Accordingly, as indicated by FIG. 18-(E), the output of the comparator 162 is immediately fixed at low-level.

Fixing the output of the comparator 162 immediately at low-level causes the synchronous rectification to transit immediately to the diode rectification. Transiting to the diode rectification prevents an adverse current from the load (the CPU 22) because the diodes D11 and D12 are arranged in a reverse direction to the load (the CPU 22).

Besides, in the present first embodiment, although the output current is detected by detecting the voltages at both ends of the output current detection resistance Rs shown in FIG. 5, the output current may be detected by detecting counter-electromotive forces occurring in the secondary coils L21 and L22.

Figure 19:
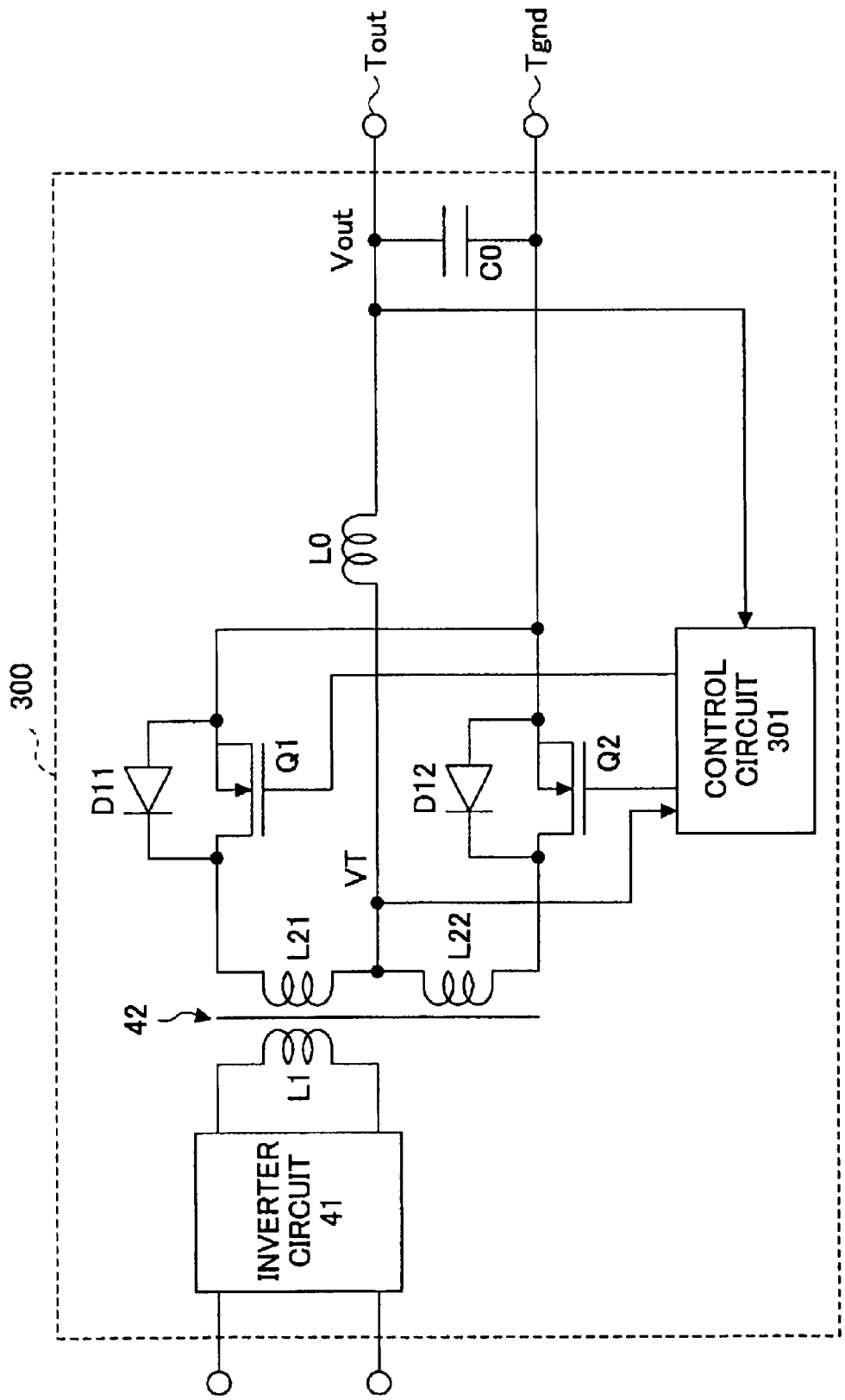
FIG. 19 is a circuit diagram of a DC-DC converting circuit as a variation of the first embodiment of the present invention.

FIG. 19 is a circuit diagram of a DC-DC converting circuit 300 as a variation of the first embodiment of the present invention. Elements in FIG. 19 that are identical or equivalent to the elements shown in FIG. 5 are referenced by the same reference marks, and will not be described in detail.

The DC-DC converting circuit 300 is different from the DC-DC converting circuit 100 shown in FIG. 5 in comprising a control circuit 301 having a different structure from the control circuit 101 of the DC-DC converting circuit 100, and in excluding the output current detection resistance Rs.

Figure 20:
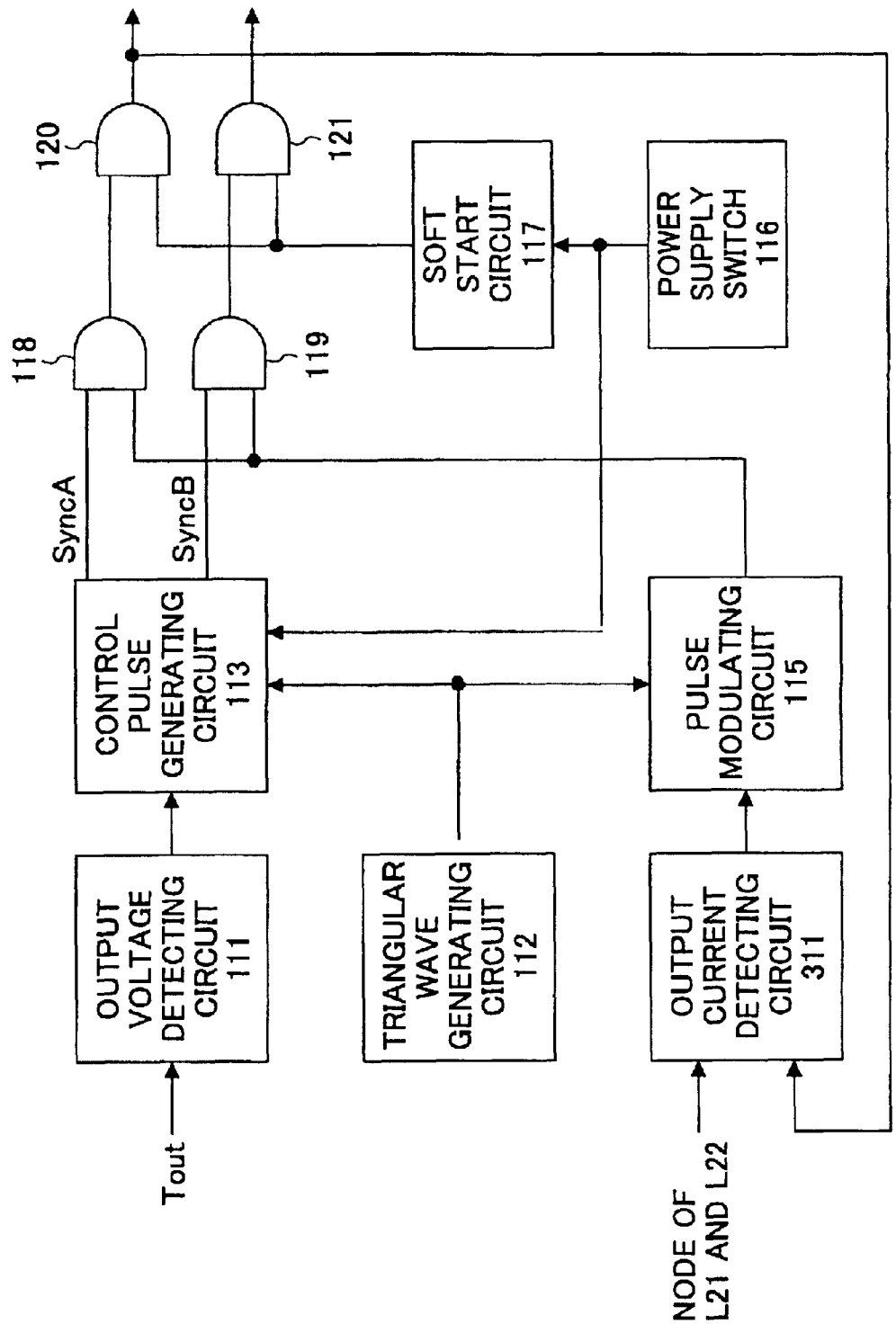
FIG. 20 is a block diagram of a control circuit shown in FIG. 19.

FIG. 20 is a block diagram of the control circuit 301. Elements in FIG. 20 that are identical or equivalent to the elements shown in FIG. 6 are referenced by the same reference marks, and will not be described in detail.

The control circuit 301 is different from the control circuit 101 shown in FIG. 6 in comprising an output current detecting circuit 311 having a different structure from the output current detecting circuit 114 of the control circuit 101. Additionally, a voltage VT at the node of the secondary coil L21 and the secondary coil L22 is impressed to the control circuit 301, and the output of the AND gate 120 is supplied to the control circuit 301.

Figure 21:
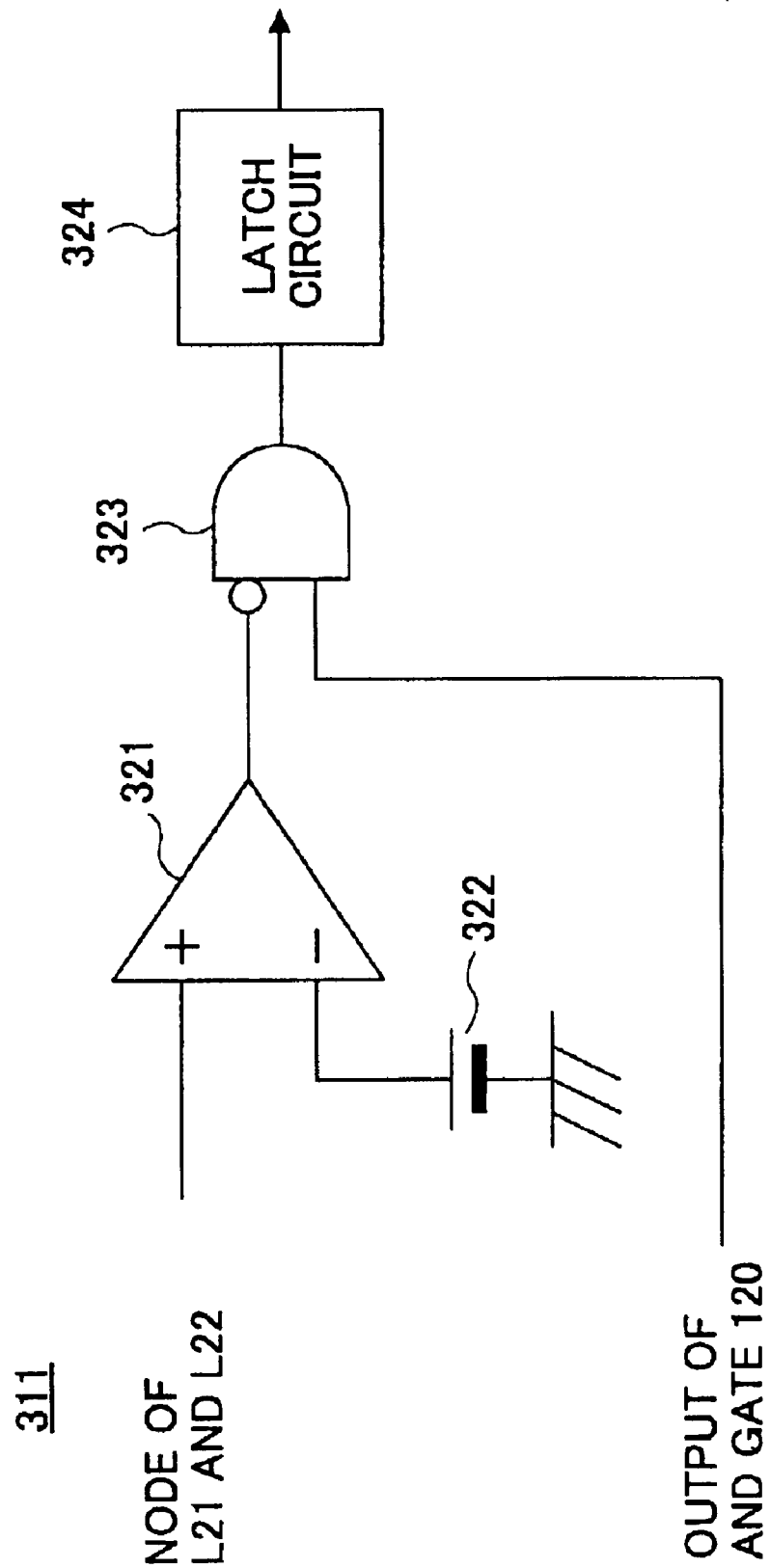
FIG. 21 is a circuit diagram of an output current detecting circuit shown in FIG. 20.

FIG. 21 is a circuit diagram of the output current detecting circuit 311.

The output current detecting circuit 311 comprises a comparator 321, a reference voltage source 322, an AND gate 323, and a latch circuit 324.

The voltage VT at the node of the secondary coil L21 and the secondary coil L22 is connected to a noninverting input terminal of the comparator 321. A reference voltage Vref is impressed from the reference voltage source 322 to an inverting input terminal of the comparator 321. The comparator 321 compares the voltage VT at the node of the secondary coil L21 and the secondary coil L22 with the reference. voltage Vref generated by the reference voltage source 322. When the voltage VT at the node of the secondary coil L21 and the secondary coil L22 is smaller than the reference voltage Vref generated by the reference voltage source 322, the comparator 321 makes an output thereof low-level. When the voltage VT at the node of the secondary coil L21 and the secondary coil L22 is larger than the reference voltage Vref generated by the reference voltage source 322, the comparator 321 makes the output thereof high-level.

The output of the comparator 321 is supplied to the AND gate 323 as an inhibit pulse. The AND gate 323 gates the output of the AND gate 120 according to the inhibit pulse supplied from the comparator 321. The output of the AND gate 120 is supplied to the latch-circuit 324. The latch circuit 324 latches the output of the AND gate 323.

Figure 22:
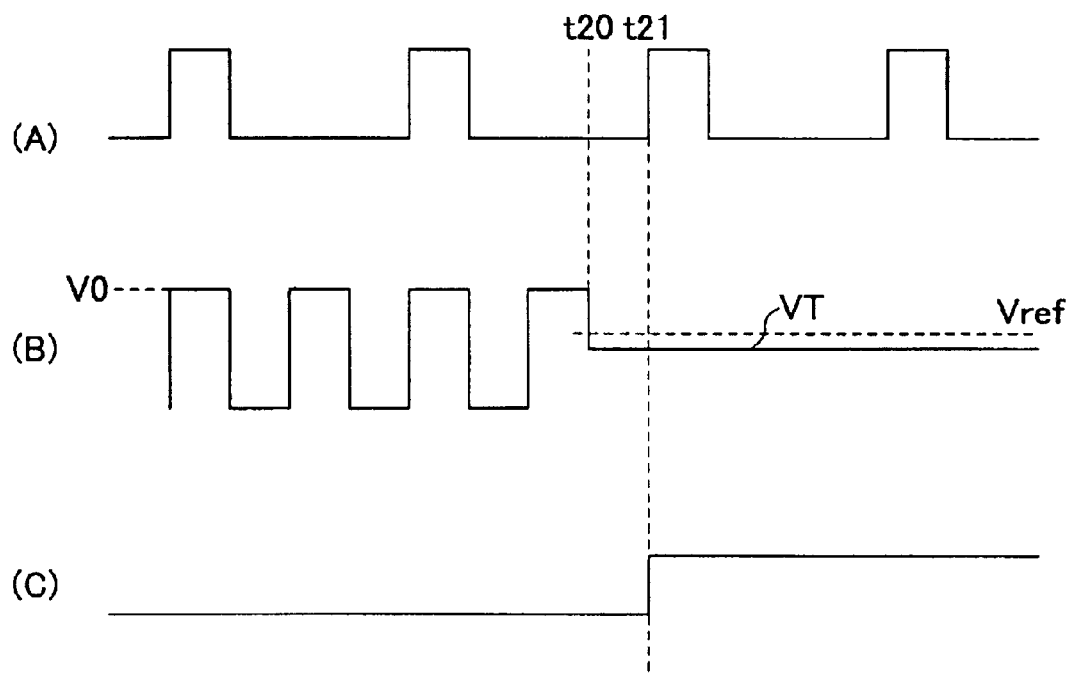
FIG. 22 is a waveform diagram representing operations of the output current detecting circuit shown in FIG. 21.

FIG. 22 is a waveform diagram representing operations of the output current detecting circuit 311. FIG. 22-(A) indicates the output of the AND gate 120. FIG. 22-(B) indicates the voltage VT at the node of the secondary coil L21 and the secondary coil L22. FIG. 22-(C) indicates an output of the latch circuit 324.

In FIG. 22, at a time t20, a current flows into the secondary coil L21 from the load (the CPU 22), i.e., an adverse current occurs. When the transistor Q21 is on, the voltage VT at the node of the secondary coil L21 and the secondary coil L22 decreases below a normal on-state voltage V0.

When the voltage VT at the node of the secondary coil L21 and the secondary coil L22 decreases below the reference voltage Vref, the output of the comparator 321 becomes low-level. When the output of the comparator 321 becomes low-level, and the output of the AND gate 120 becomes high-level at a time t21, the output of the AND gate 323 becomes high-level. The latch circuit 324 latches the high-level output of the AND gate 323 at the time t21, and makes the output of the latch circuit 324 high-level.

The output of the latch circuit 324 high-level is supplied to the pulse modulating circuit 115 as an output of the output current detecting circuit 311 so as to be used in switching between the synchronous rectification and the diode rectification, as described above.

Besides, in the heretofore-described first embodiment, the present invention is applied to an insulation DC-DC converting circuit; however, the present invention is also applicable to circuits of other types, such as a step-down DC-DC converting circuit.

Figure 23:
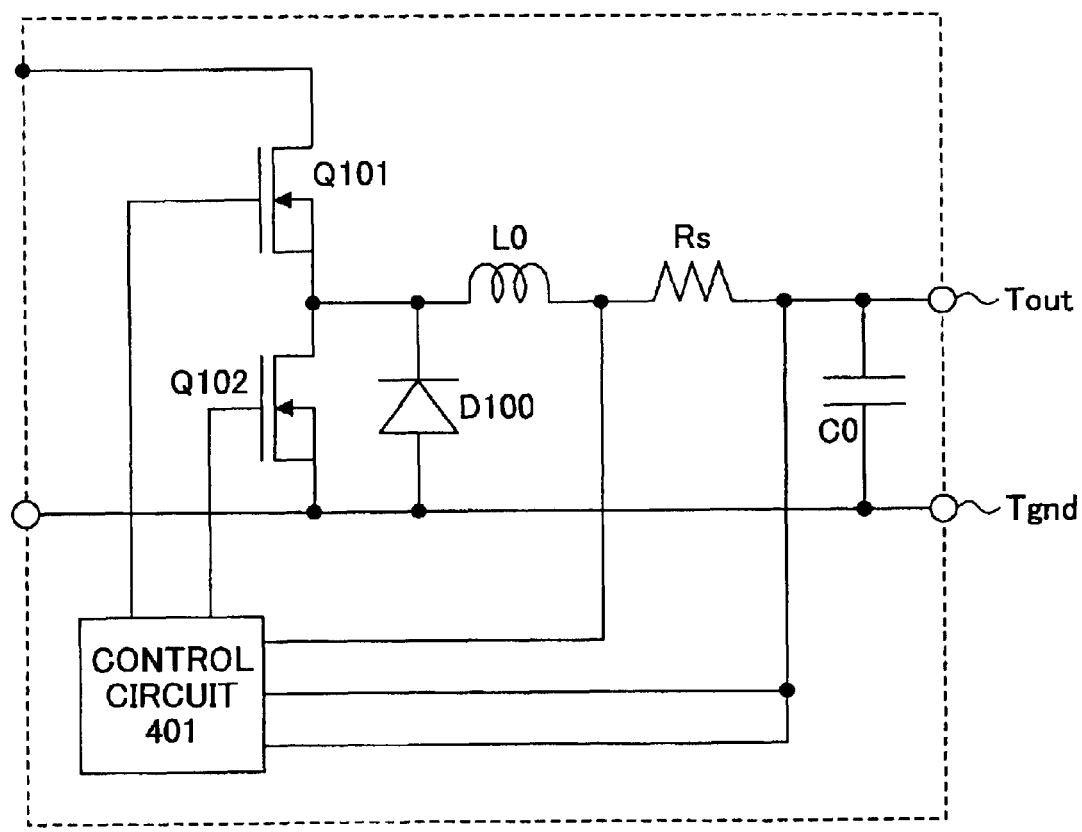
FIG. 23 is a circuit diagram of a DC-DC converting circuit according to a second embodiment of the present invention.

FIG. 23 is a circuit diagram of a DC-DC converting circuit 400 according to a second embodiment of the present invention. Elements in FIG. 23 that are identical or equivalent to the elements shown in FIG. 5 are referenced by the same reference marks, and will not be described in detail.

In the DC-DC converting circuit 400 according to the present second embodiment, the direct current voltage is impressed to transistors Q101 and Q102 having drains and sources connected in series. A diode D100 is connected to the drain and the source of the transistor Q102 in parallel. A node of the transistors Q101 and Q102 is connected to the output terminal Tout via the choke coil L0 and the output current detection resistance Rs. The smoothing capacitor C0 is connected between the output terminal Tout and the ground terminal Tgnd.

The transistors Q101 and Q102 are controlled by a control circuit 401. The control circuit 401 detects an output current flowing out from the output terminal Tout by the output current detection resistance Rs, and detects an output voltage of the output terminal Tout, so as to control the transistors Q101 and Q102.

Figure 24:
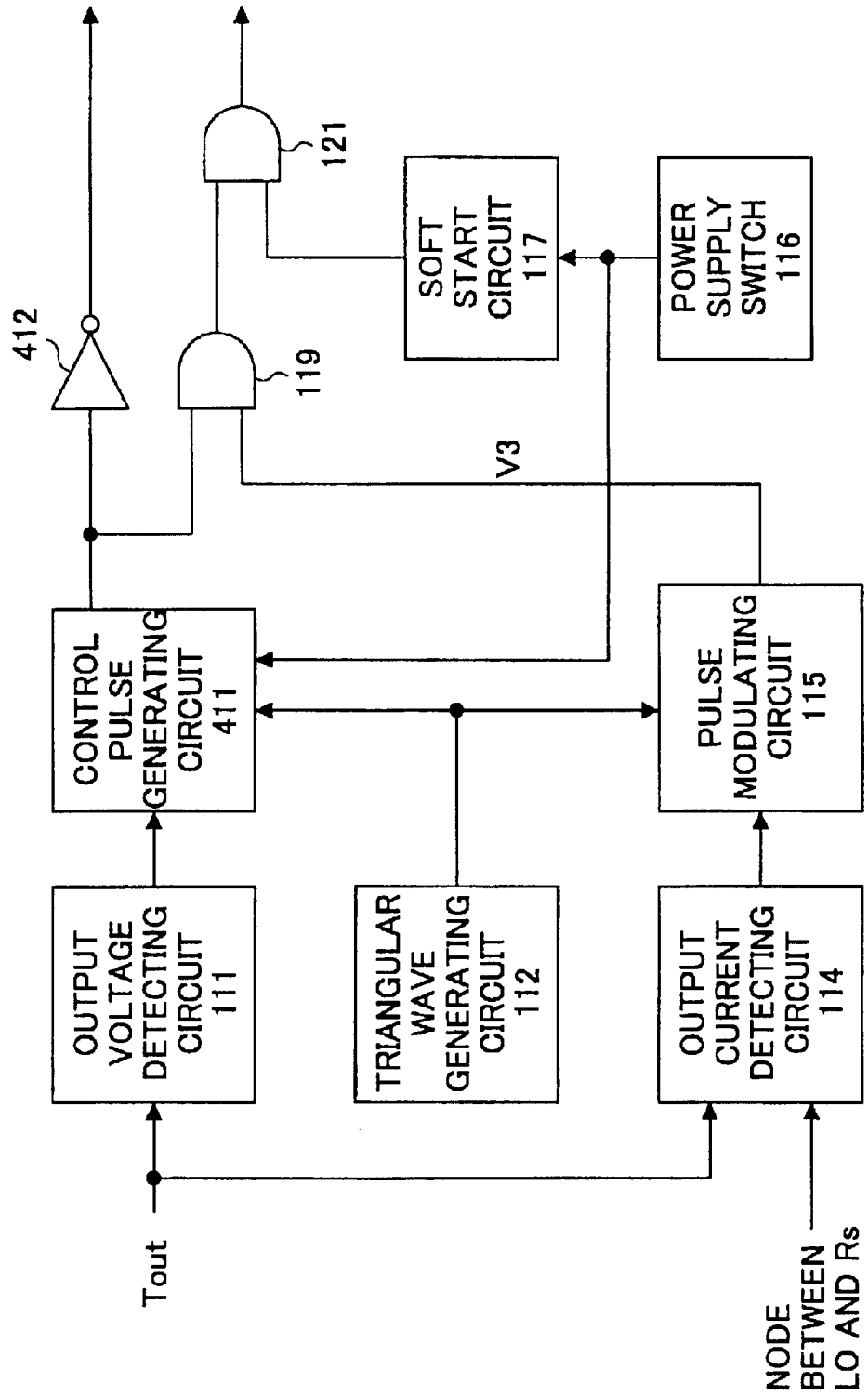
FIG. 24 is a block diagram of a control circuit shown in FIG. 23.

FIG. 24 is a block diagram of the control circuit 401. Elements in FIG. 24 that are identical or equivalent to the elements shown in FIG. 11 are referenced by the same reference marks, and will not be described in detail.

The control circuit 401 is different from the control circuit 101 shown in FIG. 6 in comprising a control pulse generating circuit 411 having a different structure from the control pulse generating circuit 113 of the control circuit 101.

Figure 25:
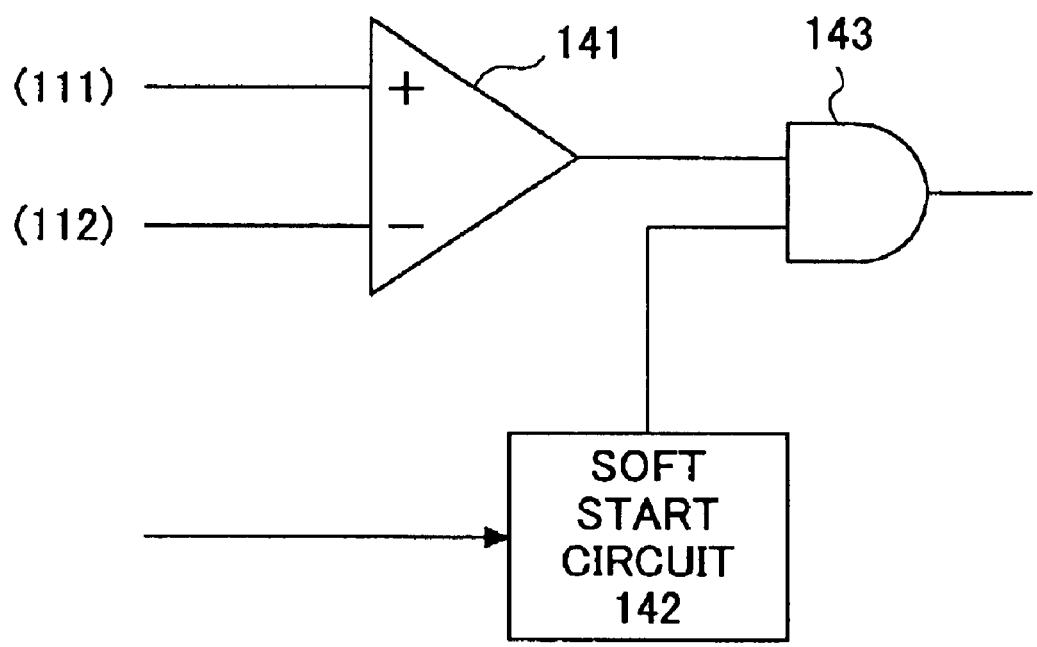
FIG. 25 is a circuit diagram of a control pulse generating circuit shown in FIG. 23.

FIG. 25 is a circuit diagram of the control pulse generating circuit 411. Elements in FIG. 25 that are identical or equivalent to the elements shown in FIG. 8 are referenced by the same reference marks, and will not be described in detail.

The control pulse generating circuit 411 comprises the comparator 141, the soft start circuit 142, and the AND gate 143, excluding the flip-flop 144, and the NAND gates 145 and 146 from the structure of the control pulse generating circuit 113 shown in FIG. 8. The control pulse generating circuit 411 outputs the output of the AND gate 143 as the control pulse.

The control pulse output from the control pulse generating circuit 411 is inverted by an inverter 412, and is supplied to a gate of the transistor Q101. The control pulse output from the control pulse generating circuit 411 is also supplied to the AND gate 119. The AND gate 119 outputs an AND-logic product of the control pulse output from the control pulse generating circuit 411 and the modulated pulse output from the pulse modulating circuit 115.

The output of the AND gate 119 is supplied to the AND gate 121. The AND gate 121 outputs an AND-logic product of the output of the AND gate 119 and the output of the soft start circuit 117. The output of the AND gate 121 is supplied to a gate of the transistor Q102.

According to the present second embodiment, when the load is light, the transistor Q102 is turned off so that the diode D100 performs a diode rectification. When the load is heavy, the transistor Q102 is switched in reverse phases with respect to the transistor Q101 so as to perform a synchronous rectification.

Whether the load is light or heavy is recognized according to the detection result of the output current detecting circuit 114 so as to switch between the diode rectification and the synchronous rectification. According to the present second embodiment, upon switching the synchronous rectification to the diode rectification, the pulse modulating circuit 115 causes the interval of switching the transistor Q102 to become gradually longer, or causes the number of times of switching the transistor Q102 to become gradually smaller such that the transistor Q102 eventually turns off. Thus, the synchronous rectification is gradually switched to the diode rectification. Upon switching the diode rectification to the synchronous rectification, the pulse modulating circuit 115 causes the interval of switching the transistor Q102, which has turned off during the diode rectification, to become gradually shorter, or causes the number of times of switching the transistor Q102 to become gradually larger such that the transistor Q102 is eventually controlled by the control pulse output from the control pulse generating circuit 411. Thus, the diode rectification is gradually switched to the synchronous rectification.

Therefore, the present second embodiment can reduce a change in the output voltage Vout resulting from a difference between on-state voltages of the transistor Q102 and the diode D100 which occurs upon switching between the synchronous rectification and the diode rectification.

Additionally, the soft start circuit 117 causes the diode rectification to be performed for the predetermined period of time T10 upon turning the power supply on, and thereafter causes the diode rectification to be switched gradually to the synchronous rectification. Thereby, an adverse current from the load (the CPU 22) can be prevented.

Besides, although the present embodiment is an electric-power supplying device detecting the output current by utilizing the resistance, the present embodiment is not limited thereto so long as the output current can be detected. Thus, the present invention is not limited in terms of a method for detecting the output current.

The present invention is not limited to the specifically disclosed embodiments, and variations and modifications may be made without departing from the scope of the present invention.

The present application is based on Japanese priority application No. 2001-335526 filed on Oct. 31, 2001, the entire contents of which are hereby incorporated by reference.

What is claimed is:

1. An electric-power supplying device comprising:
    switching elements switched according to a switching pulse so as to perform a synchronous rectification during ON state of the switching pulse;
    rectifying elements connected in parallel with said switching elements so as to perform a diode rectification during OFF state of the switching pulse; and
    a control circuit altering said switching pulse gradually with respect to a ratio of an ON state time of the switching pulse to an OFF state time thereof upon switching between said synchronous rectification and said diode rectification.

2. The electric-power supplying device as claimed in claim 1, wherein said control circuit gradually changes a pulse width of said switching pulse.

3. The electric-power supplying device as claimed in claim 1, wherein said control circuit gradually changes a frequency of said switching pulse.

4. The electric-power supplying device as claimed in claim 1, wherein said control circuit causes said rectifying elements to perform said diode rectification upon turning power supply on, and gradually alters said switching pulse after a predetermined period of time elapses since turning said power supply on so as to cause said diode rectification to transit gradually to said synchronous rectification performed by said switching elements.

5. The electric-power supplying device as claimed in claim 1, further comprising an output current detecting circuit detecting an output current,
    wherein said control circuit alters said switching pulse gradually, when said output current detected by said output current detecting circuit becomes larger than a threshold value, so as to gradually switch said diode rectification performed by said rectifying elements to said synchronous rectification performed by said switching elements.

6. The electric-power supplying device as claimed in claim 5, wherein said control circuit immediately switches said synchronous rectification performed by said switching elements to said diode rectification performed by said rectifying elements, when said output current detected by said output current detecting circuit becomes smaller than the threshold value.

7. A method for controlling an electric-power supplying device including switching elements switched according to a switching pulse so as to perform a synchronous rectification during ON state of the switching pulse and controlling an output voltage, and rectifying elements connected in parallel with said switching elements so as to perform a diode rectification during OFF state of the switching pulse and controlling said output voltage, the method comprising:

an altering step of altering said switching pulse gradually with respect to a ratio of an ON state time of the switching pulse to an OFF state time thereof upon switching between said synchronous rectification and said diode rectification.

8. The method as claimed in claim 7, wherein said altering step gradually changes a pulse width of said switching pulse.

9. The method as claimed in claim 7, wherein said altering step gradually changes a frequency of said switching pulse.

10. The method as claimed in claim 7, further comprising a step of causing said rectifying elements to perform said diode rectification upon turning power supply on, wherein said altering step gradually alters said switching pulse after a predetermined period of time elapses since turning said power supply on so as to cause said diode rectification to transit gradually to said synchronous rectification performed by said switching elements.

11. The method as claimed in claim 7, further comprising a step of detecting an output current, wherein said altering step alters said switching pulse gradually, when said output current becomes larger than a threshold value, so as to gradually switch said diode rectification performed by said rectifying elements to said synchronous rectification performed by said switching elements.

12. The method as claimed in claim 11, wherein said altering step immediately switches said synchronous rectification performed by said switching elements to said diode rectification performed by said rectifying elements, when said output current becomes smaller than the threshold value.

13. A control circuit for controlling an electric-power supplying device having switching elements switched according to a switching pulse so as to perform a synchronous rectification during ON state of the switching pulse, and rectifying elements connected parallel with said switching elements so as to perform a diode rectification during OFF state of the switching pulse, said control circuit comprising:

an altering unit altering said switching pulse gradually with respect to a ratio of an ON state time of the switching pulse to an OFF state time thereof upon switching between said synchronous rectification and said diode rectification.

14. The control circuit as claimed in claim 13, wherein said altering unit gradually changes a pulse width of said switching pulse.

15. The control circuit as claimed in claim 13, wherein said altering unit gradually changes a frequency of said switching pulse.

16. The control circuit as claimed in claim 13, wherein said altering unit causes said rectifying elements to perform said diode rectification upon turning power supply on, and gradually alters said switching pulse after a predetermined period of time elapses since turning power supply on so as to cause said diode rectification to transit gradually to said synchronous rectification performed by said switching elements.

17. A control circuit for controlling an electric-power supplying device having switching elements switched according to a switching pulse so as to perform a synchronous rectification during ON state of the switching pulse, rectifying elements connected parallel with said switching elements so as to perform a diode rectification during OFF state of the switching pulse, and an output current detecting circuit detecting an output current, said control circuit comprising:

an altering unit altering said switching pulse gradually when said output current detected by said output detecting circuit becomes larger than a threshold value, so as to gradually switch said diode rectification to said synchronous rectification with respect to a ratio of an ON state time of the switching pulse to an OFF state time thereof.

18. The control circuit as claimed in claim 17, wherein said altering unit immediately switches said synchronous rectification performed by said switching elements to said diode rectification performed by said rectifying elements, when said output current detected by said output current detecting circuit becomes smaller than the threshold value.

* * * * *

UNITED STATES PATENT AND TRADEMARK OFFICE
CERTIFICATE OF CORRECTION

PATENT NO. : 6,778,417 B2
DATED : August 17, 2004
INVENTOR(S) : Itakura et al.

It is certified that error appears in the above-identified patent and that said Letters Patent is hereby corrected as shown below:

<u>Title page, Item [54] and Column 1, lines 1-5,</u>
Title, please change to read as follows: -- ELECTRIC-POWER SUPPLYING DEVICE SWITCHING BETWEEN A SYNCHRONOUS RECTIFICATION AND A DIODE RECTIFICATION BY GRADUALLY ALTERING A SWITCHING PULSE --.

Signed and Sealed this

Twenty-eighth Day of December, 2004

JON W. DUDAS
*Director of the United States Patent and Trademark Office*